Figure 1:
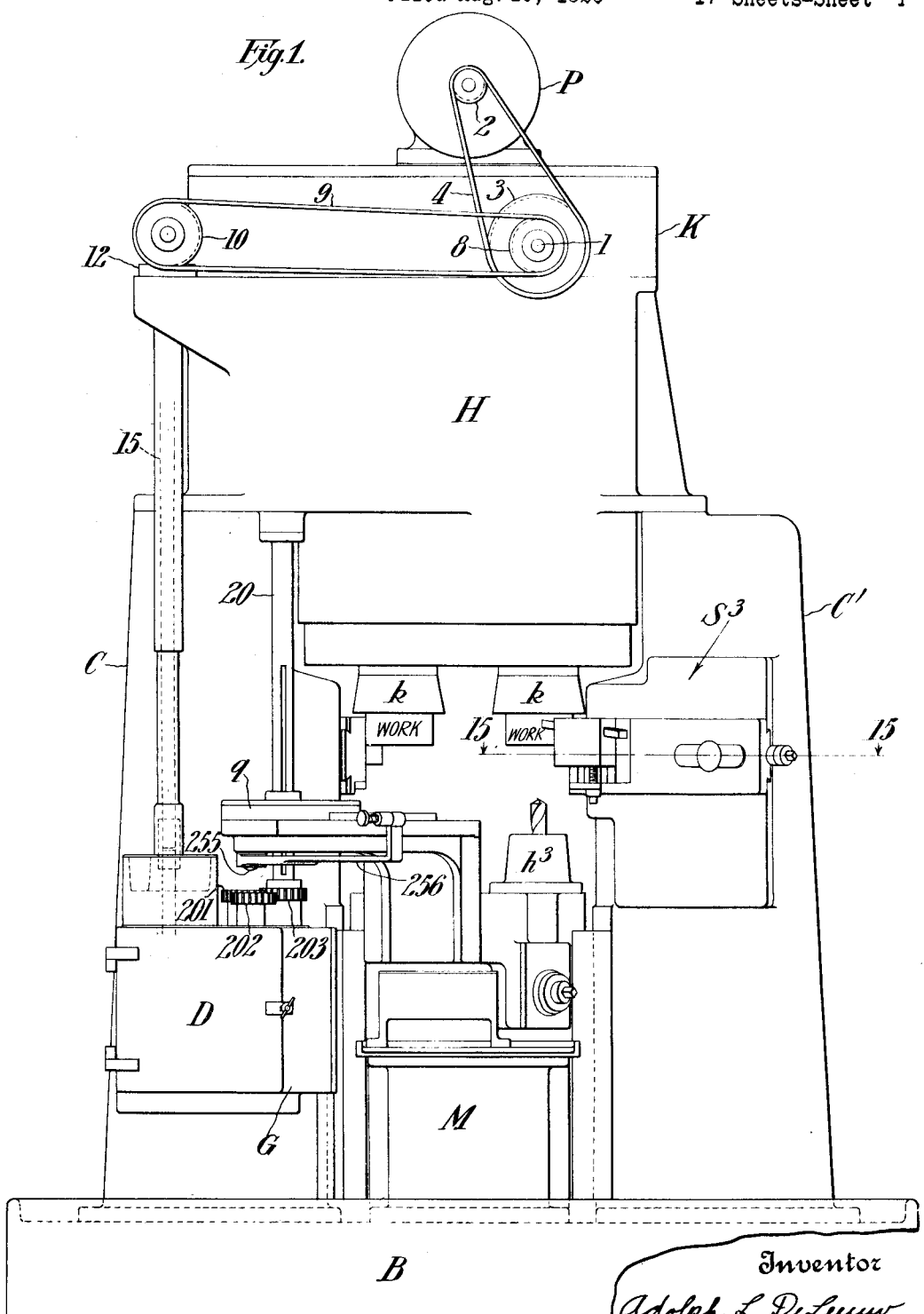

May 29, 1928. 1,671,354
A. L. DE LEEUW
INVERTED UNITARY CHUCKING MACHINE
Filed Aug. 10, 1926 17 Sheets-Sheet 3

Inventor
Adolph L. De Leeuw
By Attorney
Albert F. Nathan

May 29, 1928.

A. L. DE LEEUW 1,671,354

INVERTED UNITARY CHUCKING MACHINE

Filed Aug. 10, 1926 17 Sheets-Sheet 5

Inventor
Adolph L. De Leeuw
By Attorney
Albert F. Nathan

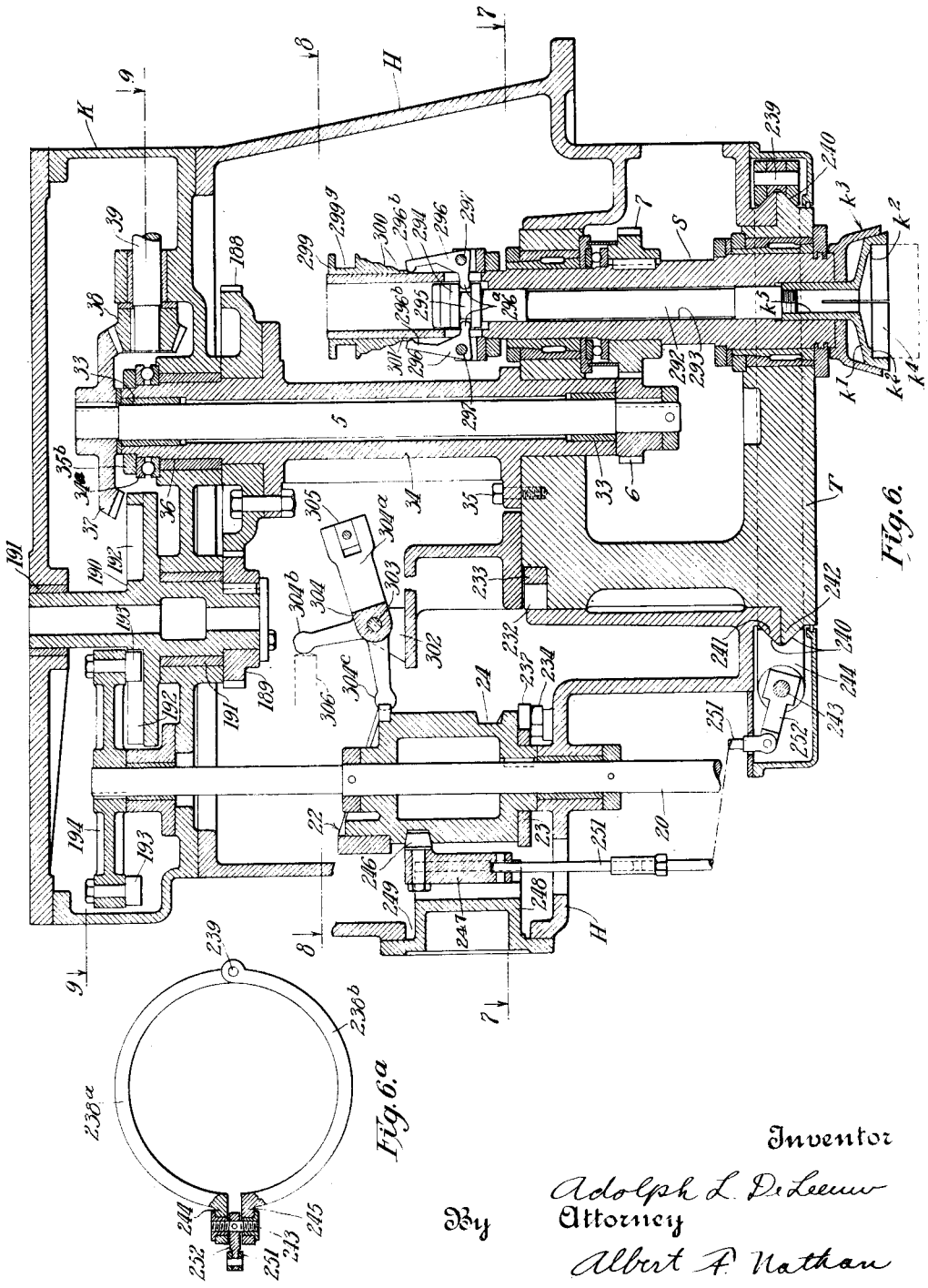

May 29, 1928.
A. L. DE LEEUW
1,671,354
INVERTED UNITARY CHUCKING MACHINE
Filed Aug. 10, 1926   17 Sheets-Sheet 7
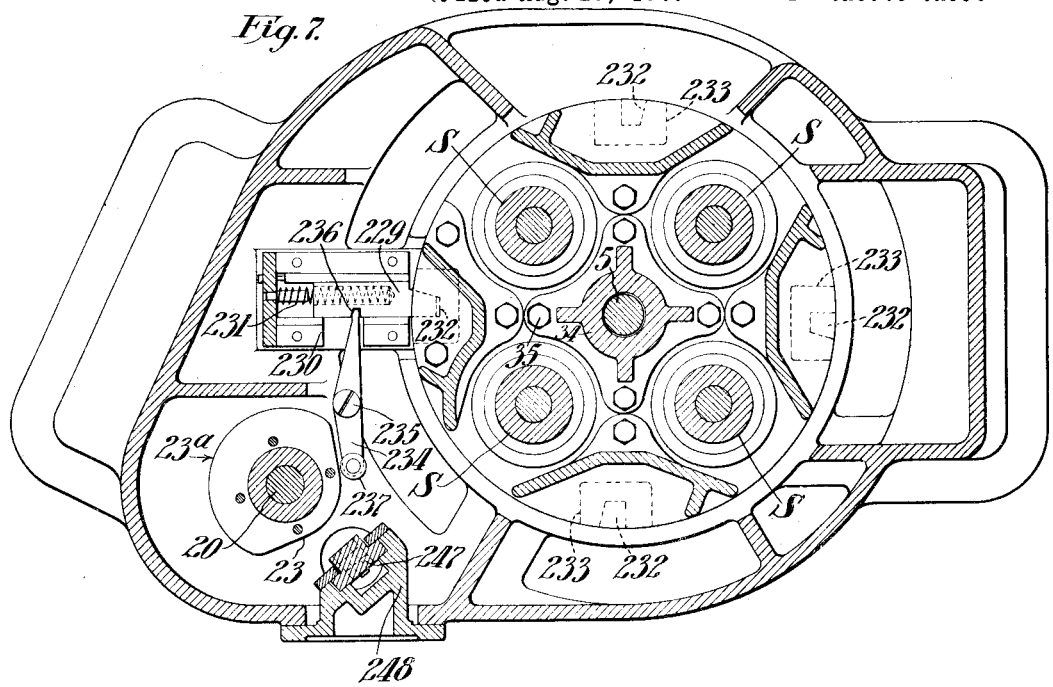
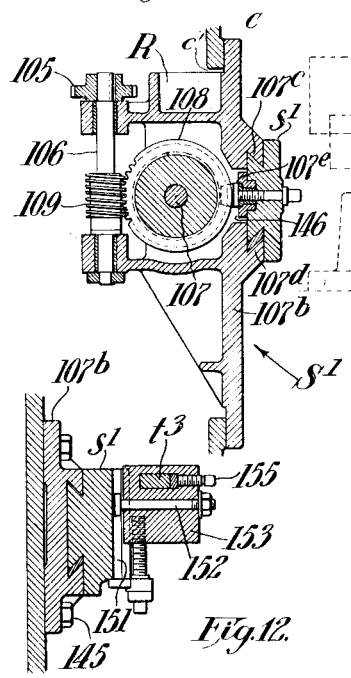
Inventor
Adolph L. De Leeuw
By Attorney
Albert F. Nathan May 29, 1928.

A. L. DE LEEUW 1,671,354

INVERTED UNITARY CHUCKING MACHINE

Filed Aug. 10, 1926   17 Sheets-Sheet 8

Inventor
Adolph L. DeLeeuw
By Attorney
Albert F. Nathan

May 29, 1928.  1,671,354
A. L. DE LEEUW
INVERTED UNITARY CHUCKING MACHINE
Filed Aug. 10, 1926  17 Sheets-Sheet 9
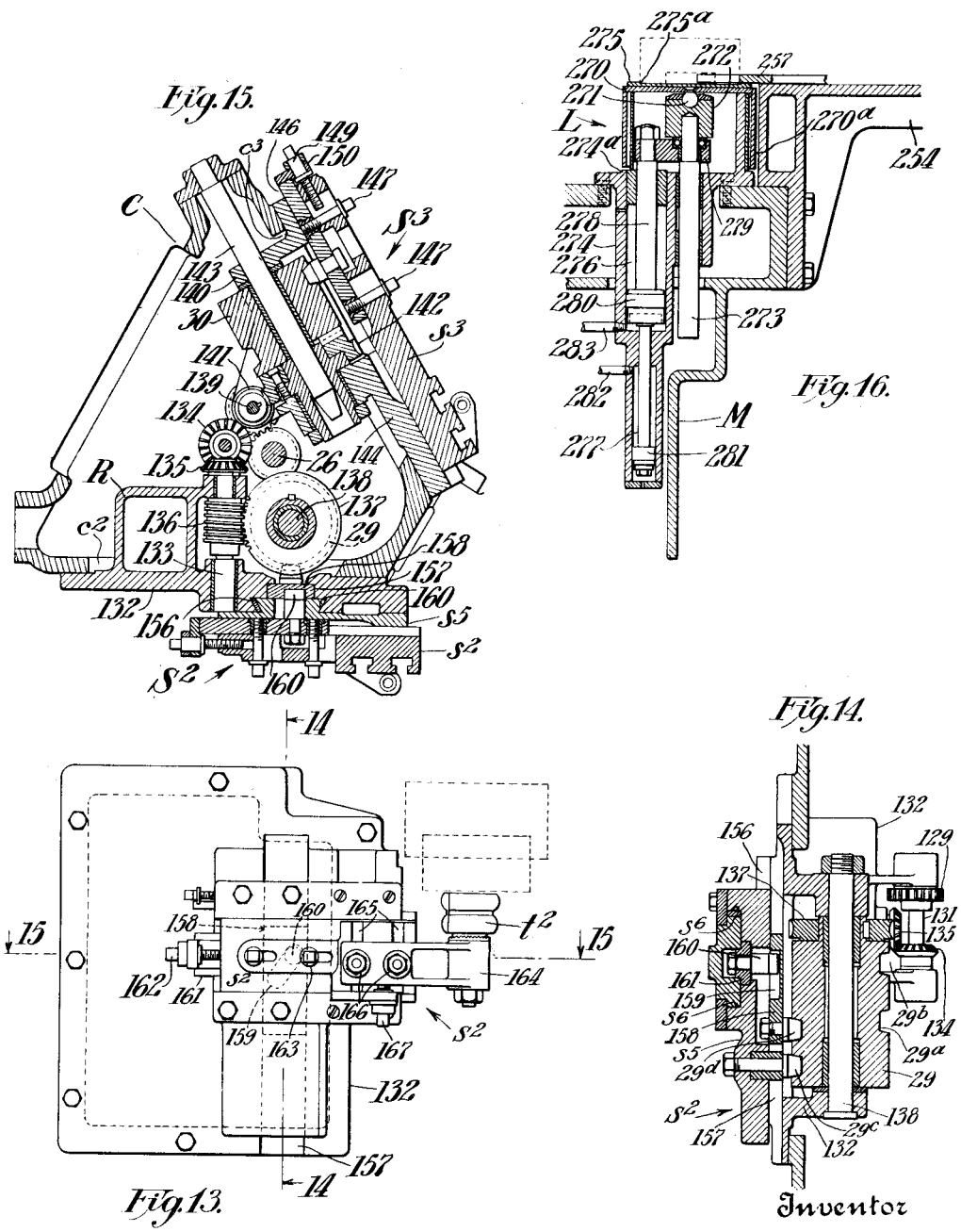
Inventor
Adolph L. DeLeeuw
By Attorney
Albert F. Nathan May 29, 1928.
A. L. DE LEEUW
1,671,354
INVERTED UNITARY CHUCKING MACHINE
Filed Aug. 10, 1926      17 Sheets-Sheet 10
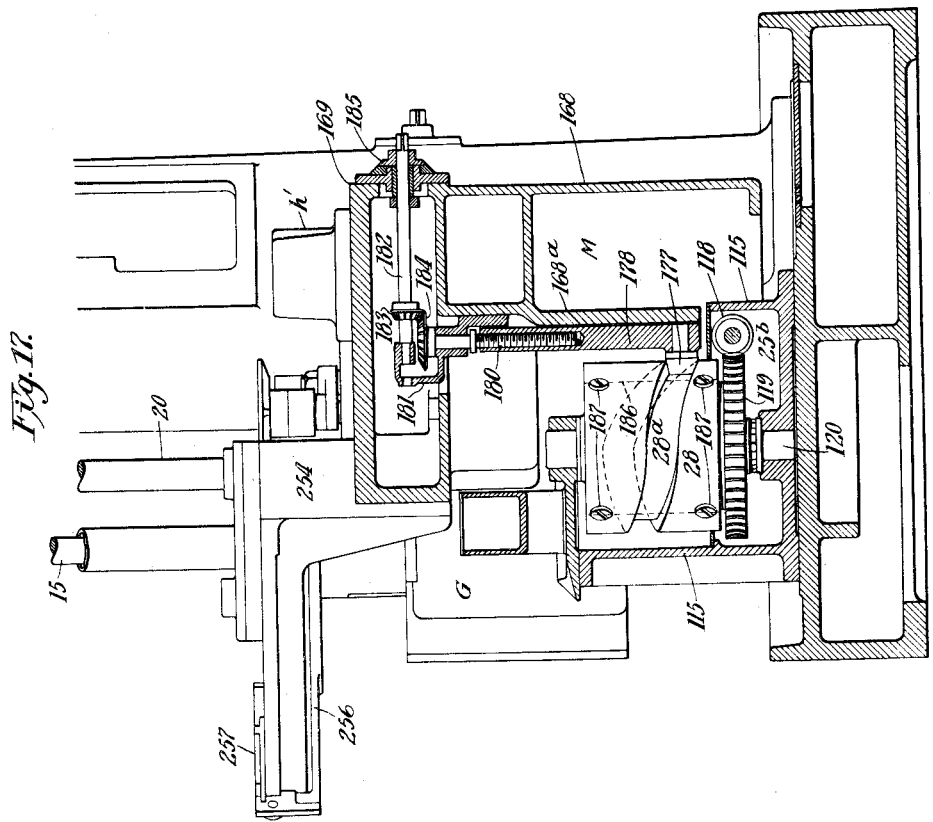
Inventor
Adolph L. De Leeuw
By Attorney
Albert F. Nathan

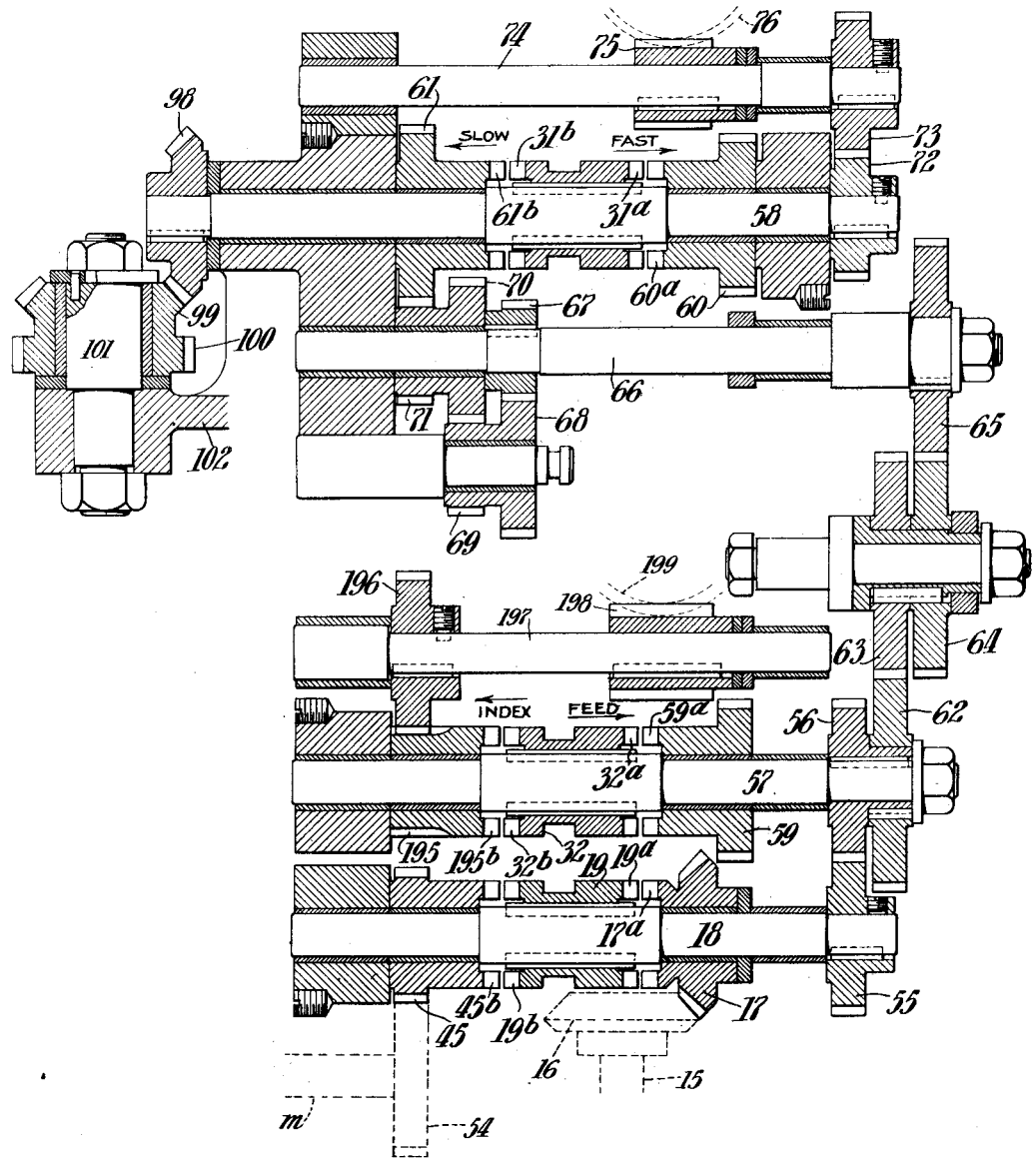

May 29, 1928.
A. L. DE LEEUW
1,671,354
INVERTED UNITARY CHUCKING MACHINE
Filed Aug. 10, 1926     17 Sheets-Sheet 12
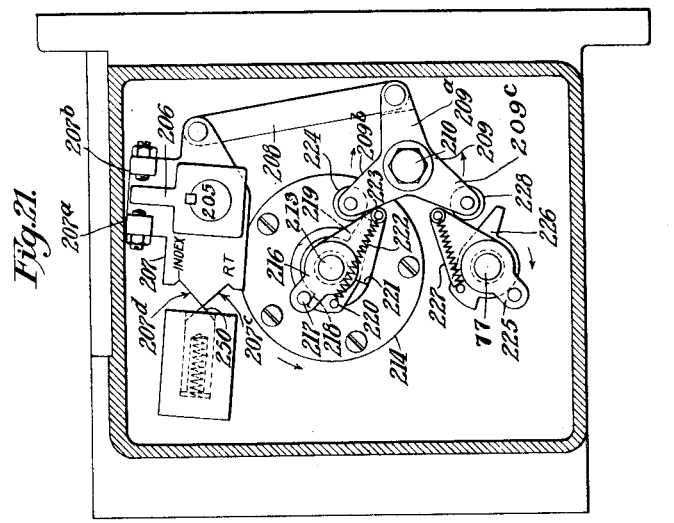
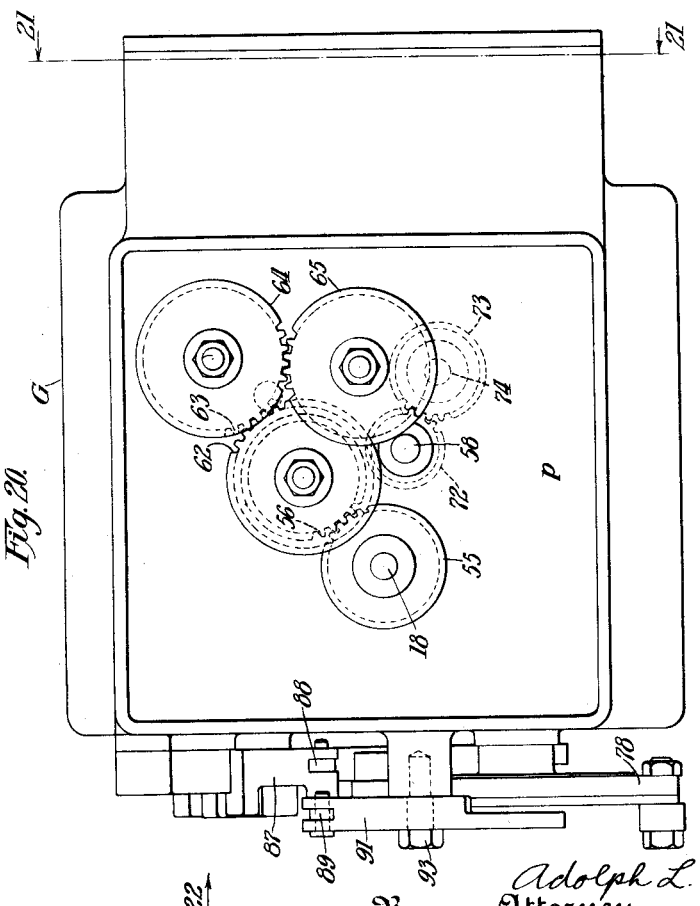
Inventor
Adolph L. De Leeuw
By Attorney
Albert F. Nathan

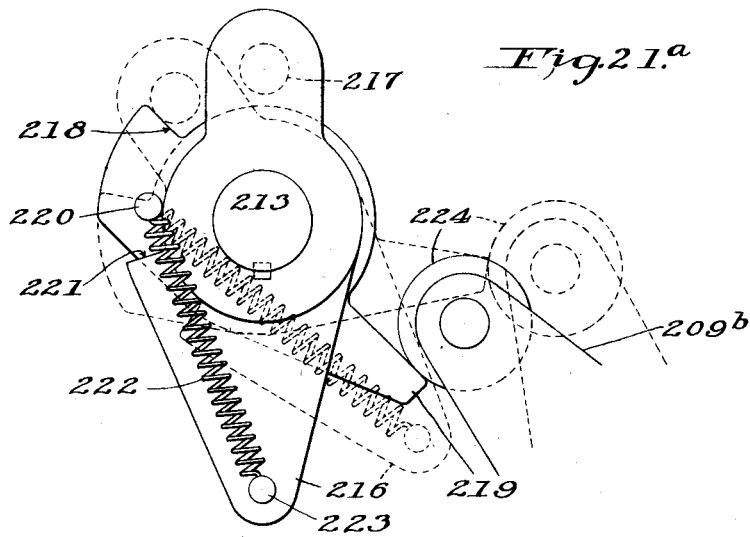
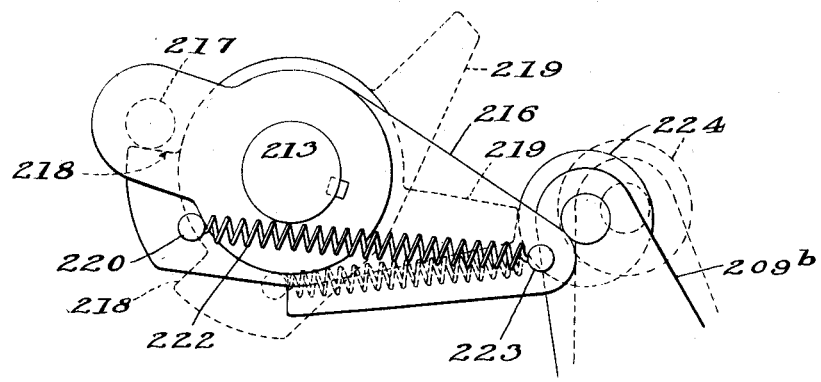

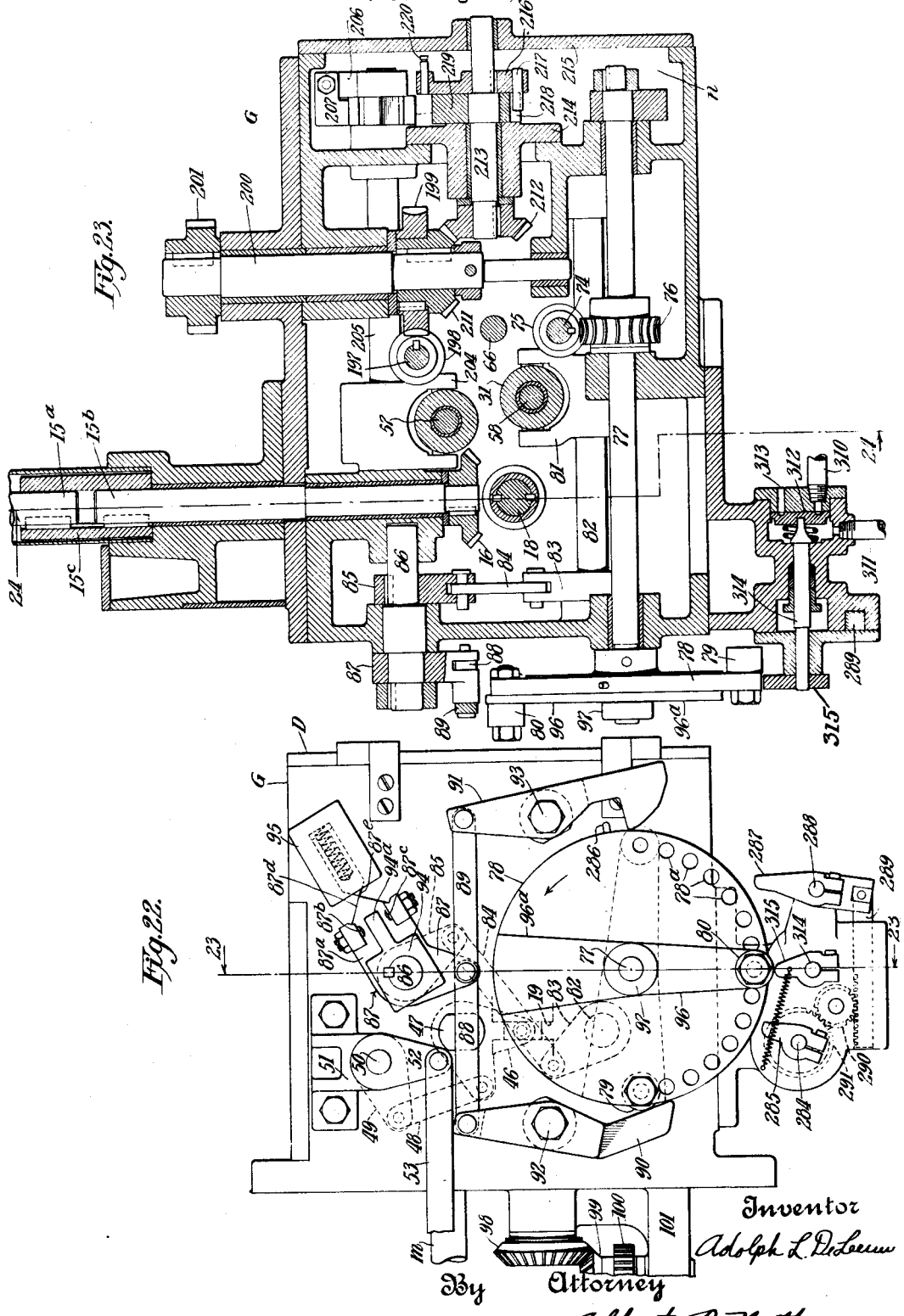

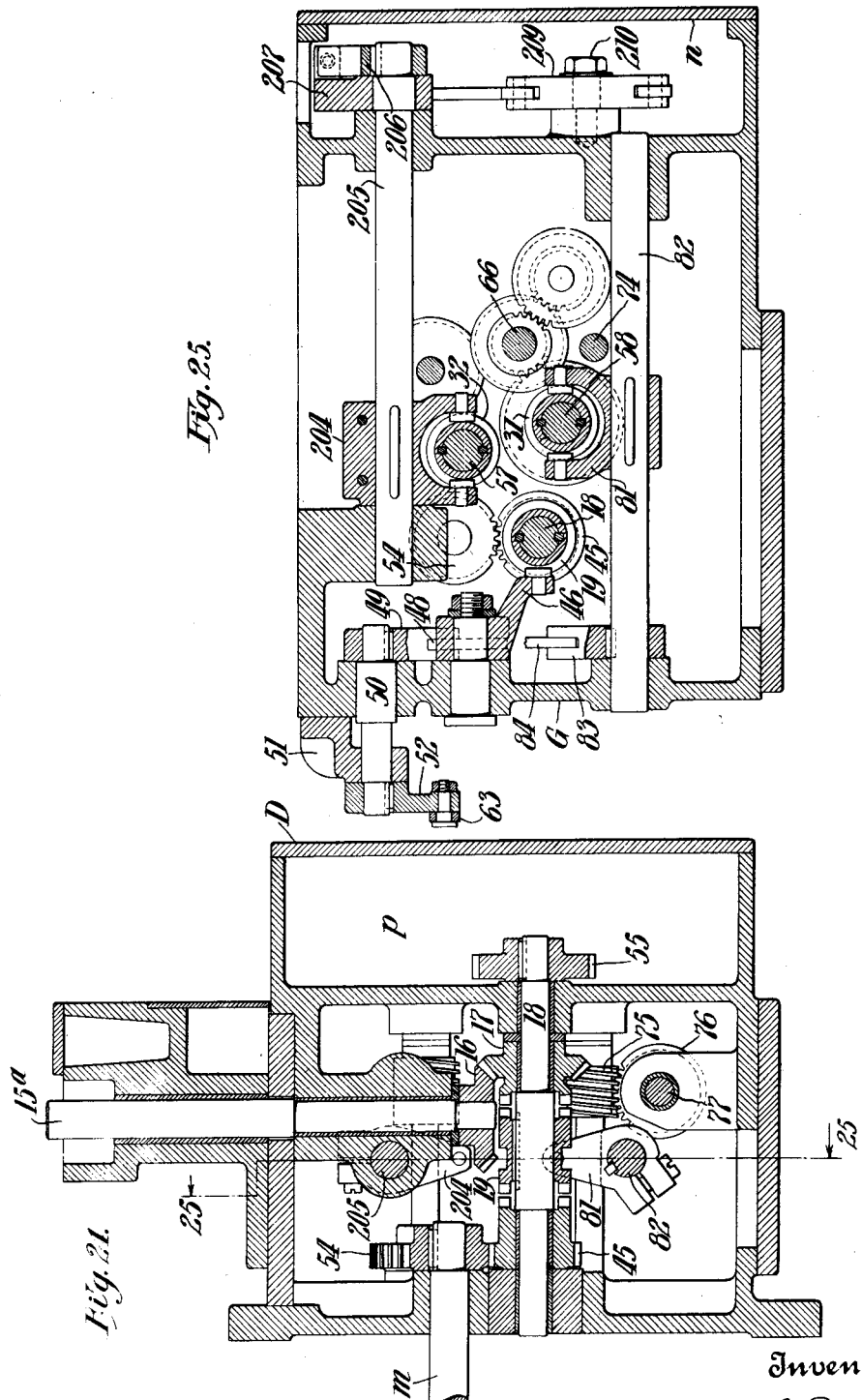

May 29, 1928.  
A. L. DE LEEUW  
1,671,354  
INVERTED UNITARY CHUCKING MACHINE  
Filed Aug. 10, 1926    17 Sheets-Sheet 16

Inventor  
Adolph L. DeLeeuw  
By  Attorney  
Albert F. Nathan

May 29, 1928.

A. L. DE LEEUW 1,671,354

INVERTED UNITARY CHUCKING MACHINE

Filed Aug. 10, 1926   17 Sheets-Sheet 17

Inventor
Adolph L. De Leeuw
By Attorney
Albert F. Nathan

Patented May 29, 1928.

1,671,354

UNITED STATES PATENT OFFICE.

ADOLPH L. DE LEEUW, OF PLAINFIELD, NEW JERSEY.

INVERTED UNITARY CHUCKING MACHINE.

Application filed August 10, 1926. Serial No. 128,491.

This invention goes to the organization of machines adapted periodically to receive blanks or pieces of work, and to perform thereon one or more forming operations successively or simultaneously or both according to the nature of the work and the character of the operations desired.

It is desirable that all such automatic or semi-automatic machines should have a high working out-put, should occupy the least possible floor area, should be combined of units easy to manufacture and assemble, should be convertible into modifications suitable for a wide variety of work by an interchange of units, and should embody a general transmission system imparting appropriate movements to terminal elements without necessitating undue massiveness or excessive speeds of speed changers.

Those are among the objectives of this invention. Also it aims, by a unique method of indexing, to perform as many operations on the work through the use of a smaller number of work-carriers than have heretofore been deemed necessary in conventional machines; this resulting from utilizing a pause at a mid-station for effecting the discharge of each more or less finished blank or piece of work. And, to ensure longevity of precision, the comparatively delicate Geneva stop indexer is relieved from the unclamping strains when the work is being released.

It is usual, in upright machines, for the work carriers to underlie the tools; with the result that the chips accumulate on the work and on the work-carriers. This interferes with work-replacement and, in certain cases, with the finish of the cutting action, and it involves loss of time by the attendant in clearing away the chips and in cleaning the clamping surfaces of the work carriers. An aim of my invention is to obviate this difficulty by inverting the aforesaid conventional relation, thereby utilizing gravity in automatically removing chips as rapidly as they are produced and in thus keeping the work-carriers free and always in condition to receive new blanks without any cramping or displacements. Thereby also, the automatic insertions of new blanks may be accomplished by a simpler mechanism since the blanks may rest naturally on the appropriate parts of the inserter and require no elaborate clamps or fingers to ensure that they will enter the chucks in correct positions. Again, this greatly simplifies the removal of finished blanks for, by merely opening the chucks, the finished blanks may fall onto the table or into a suitable chute.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 2:
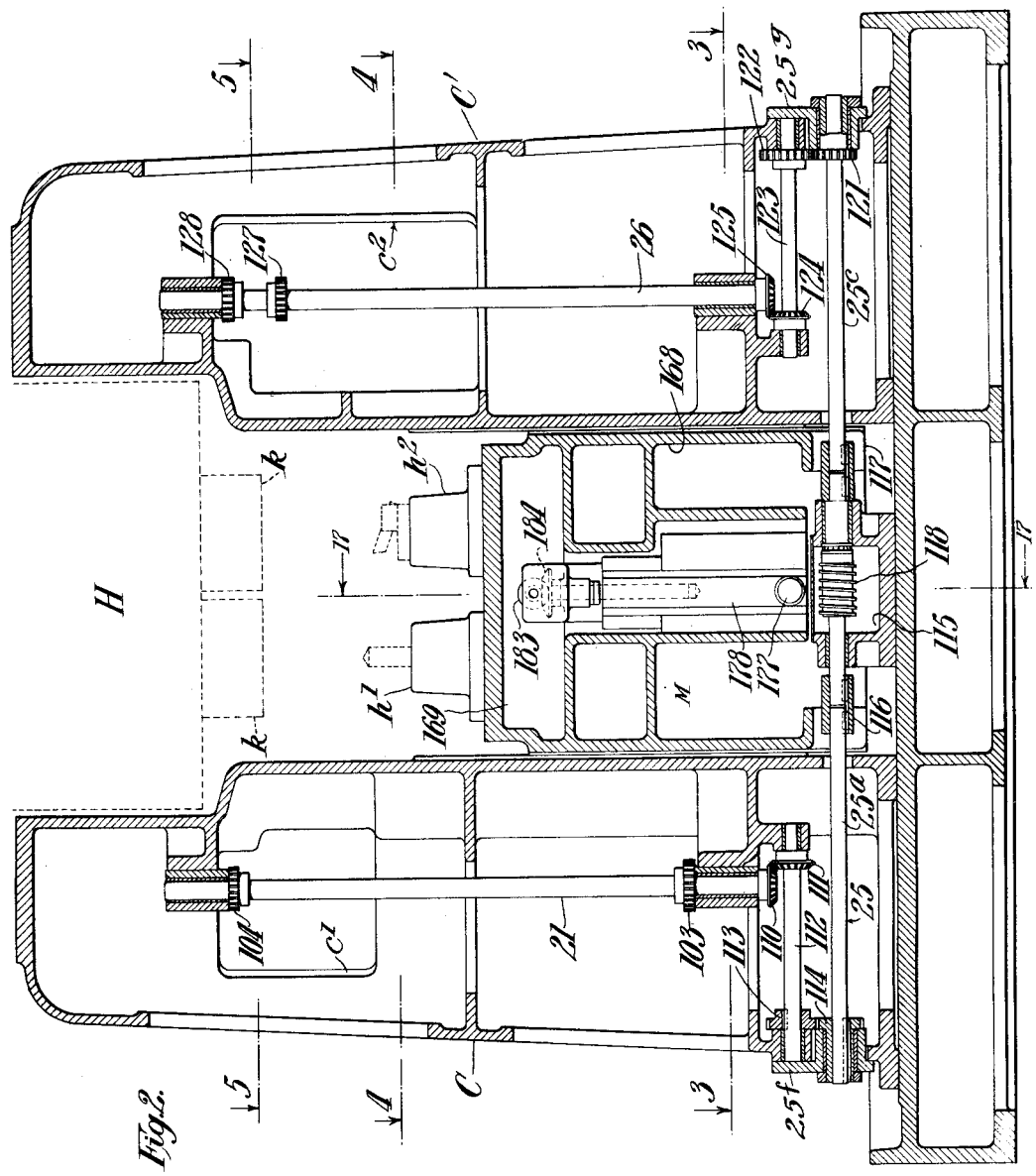
Figure 3:
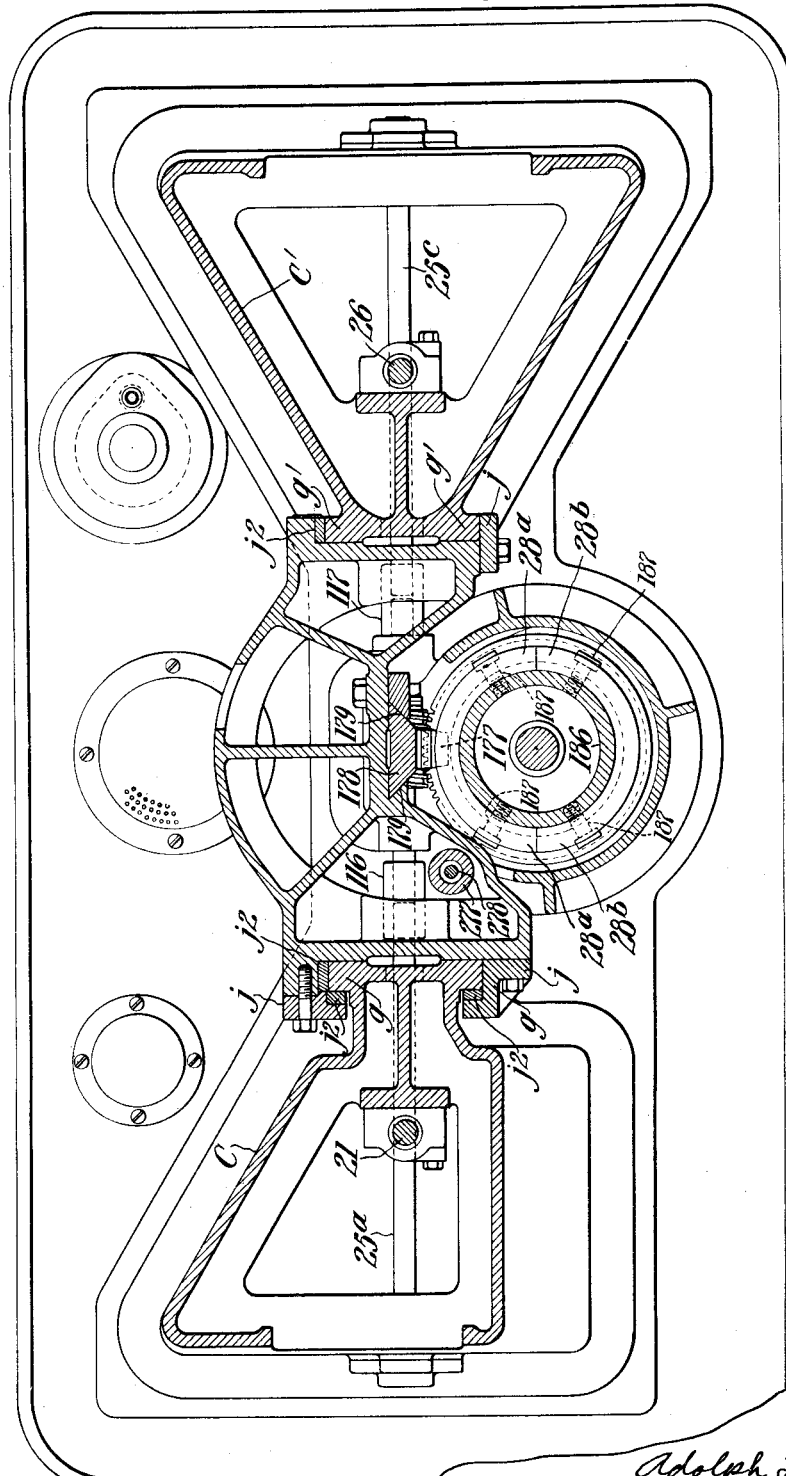
Figure 4:
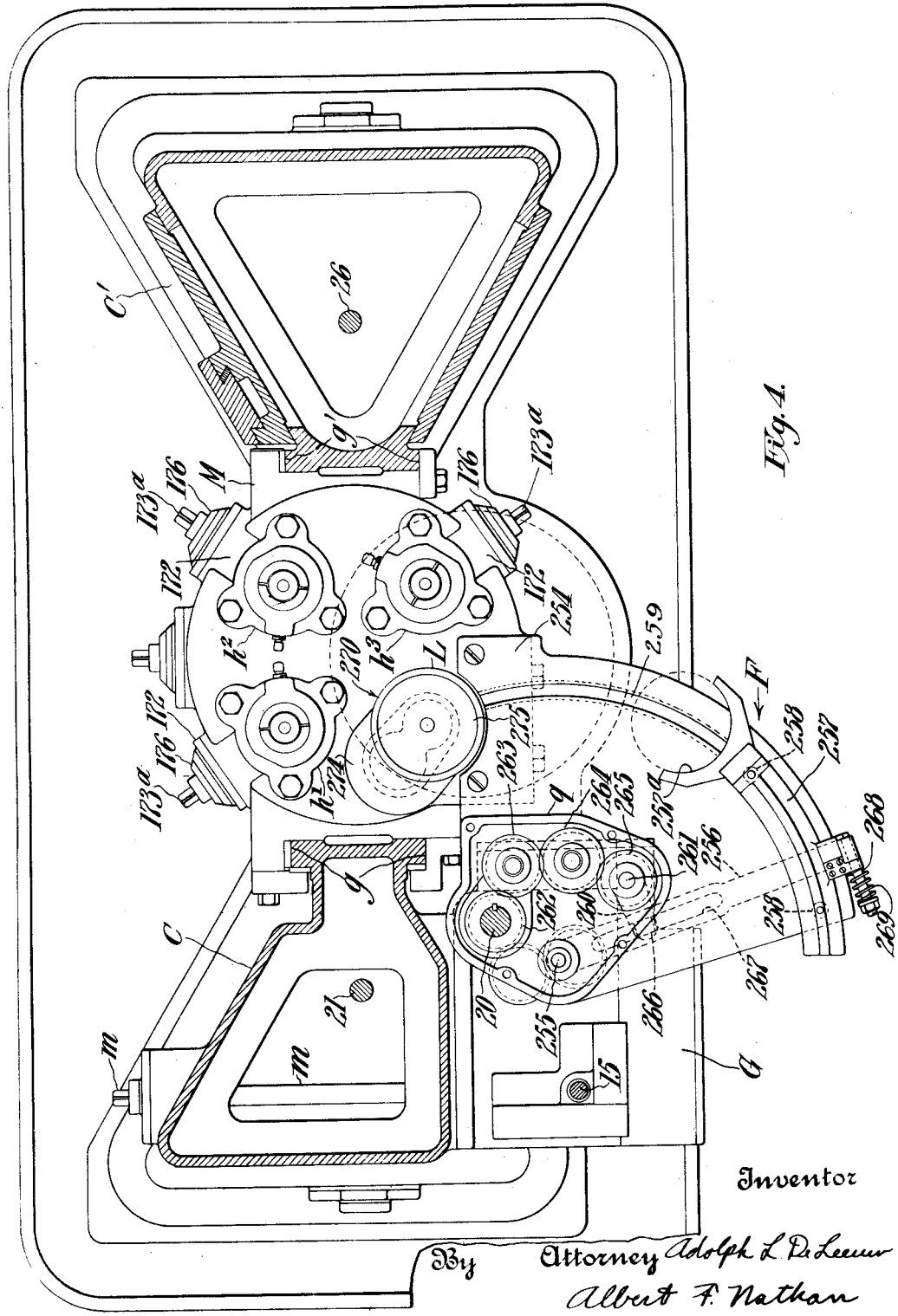
Figure 5:
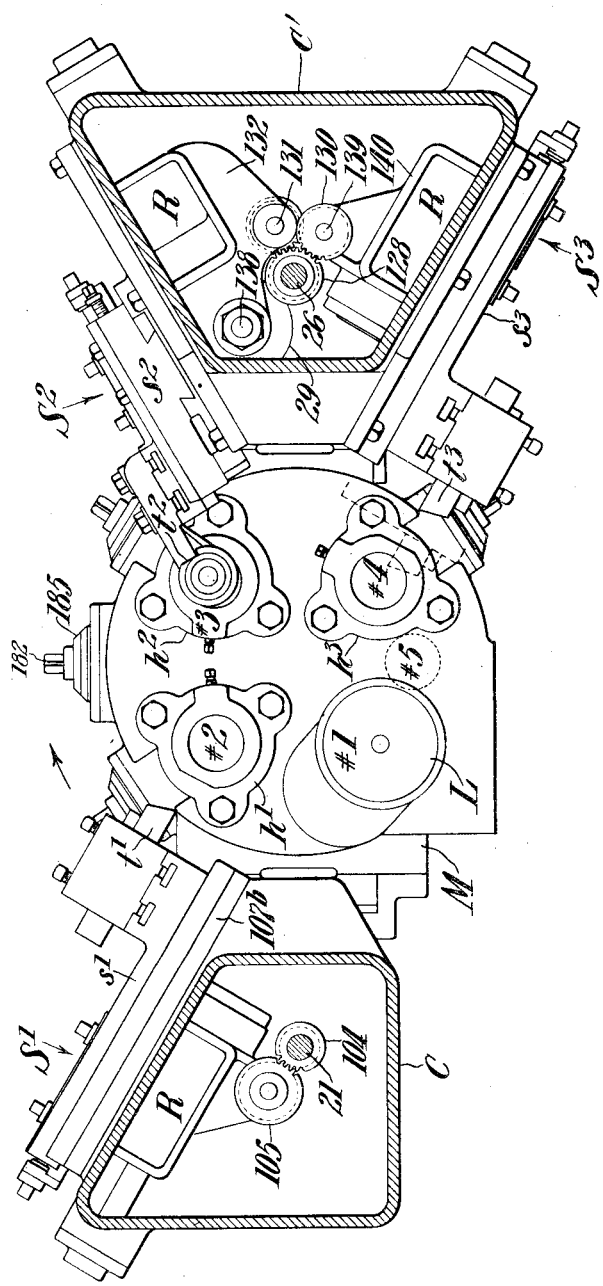
Figure 9:
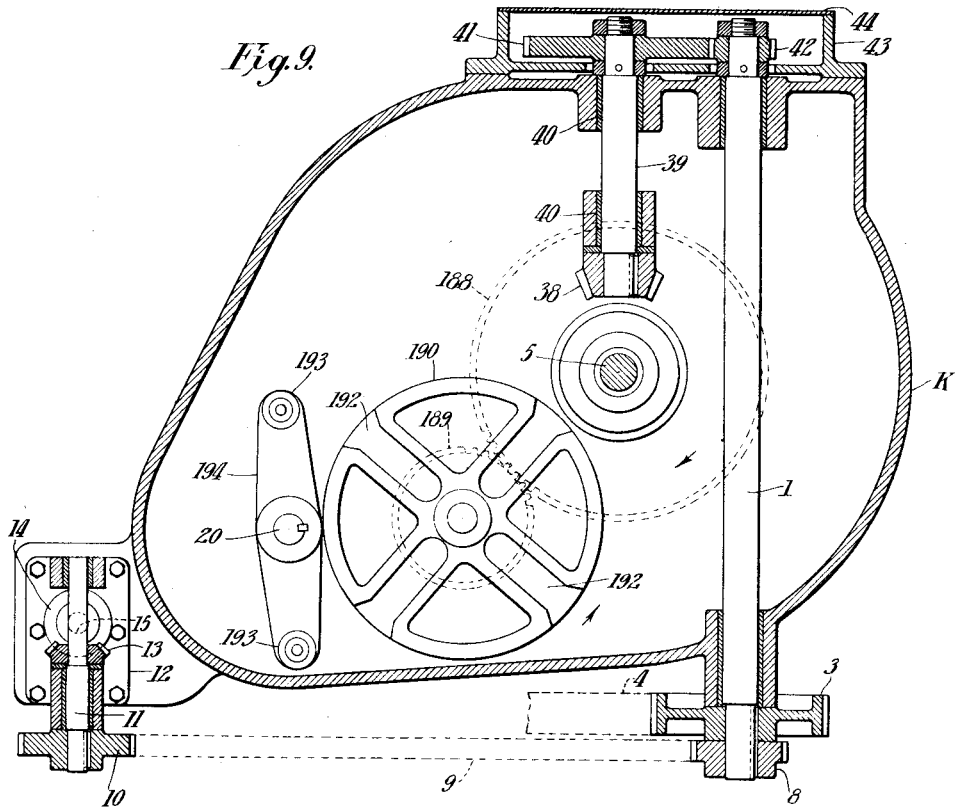
Figure 8:
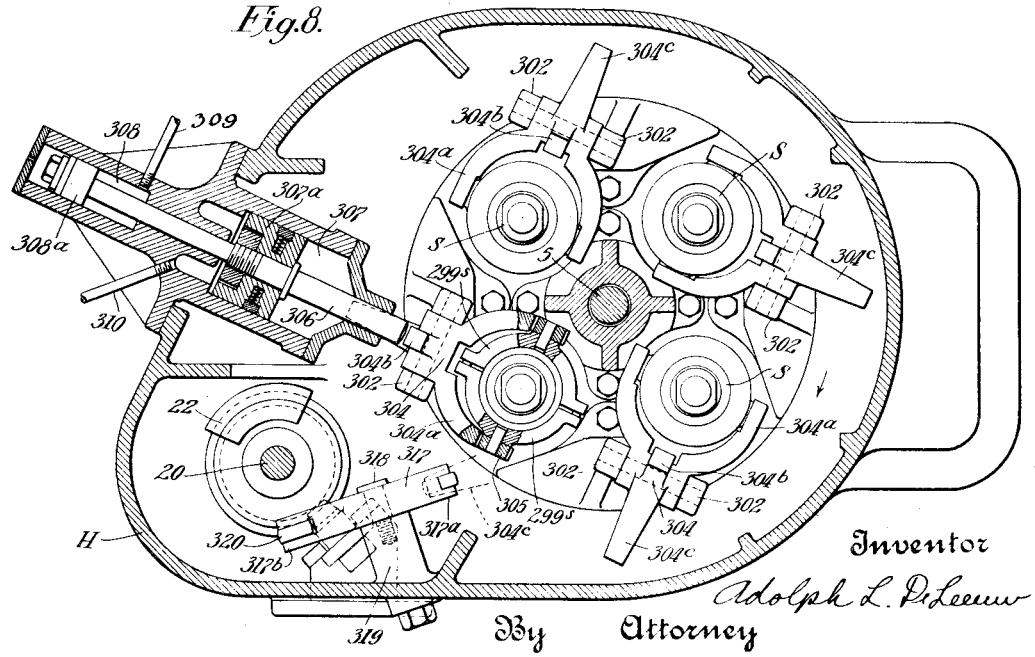
Figure 26:
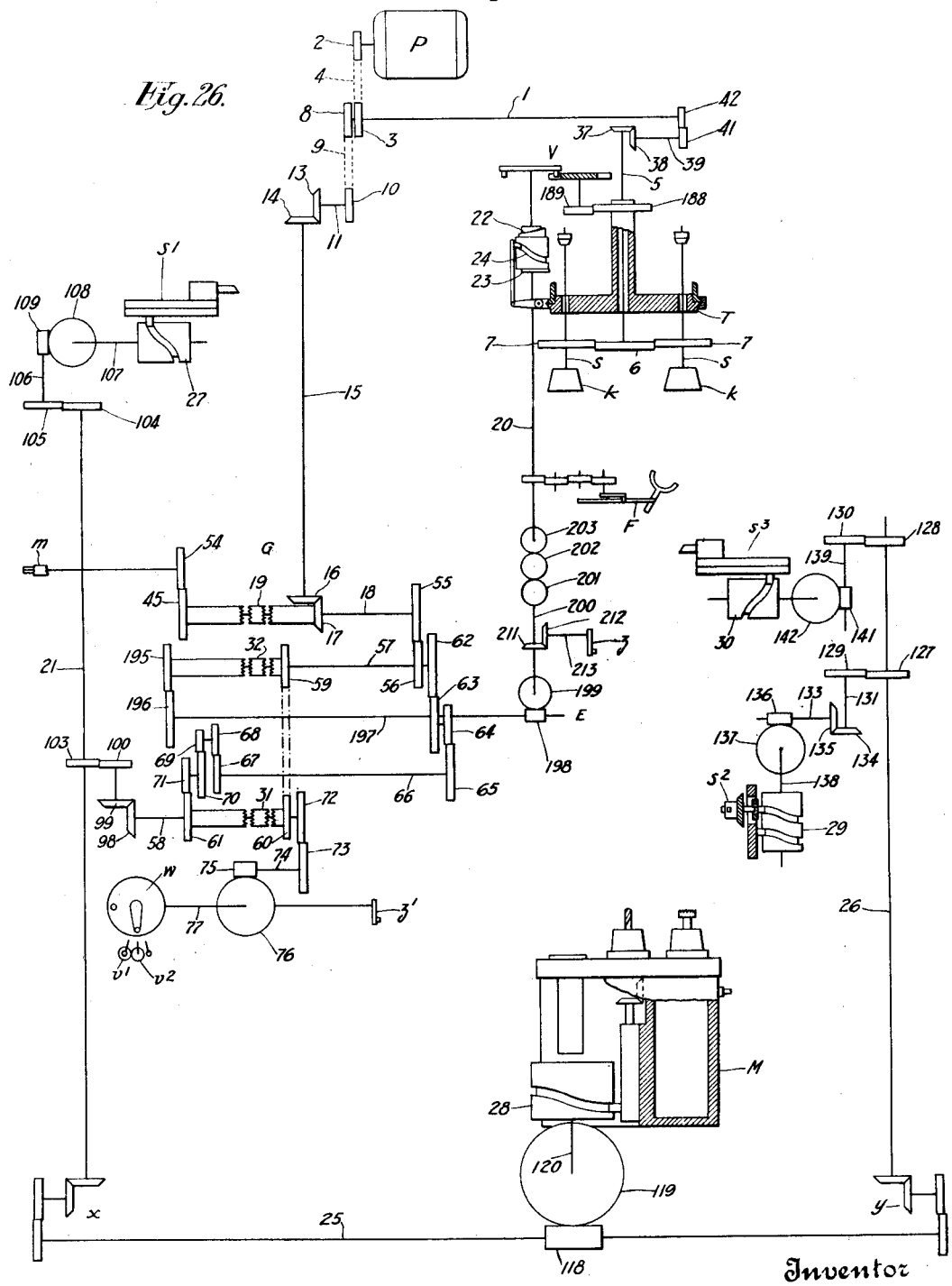
Figure 28:
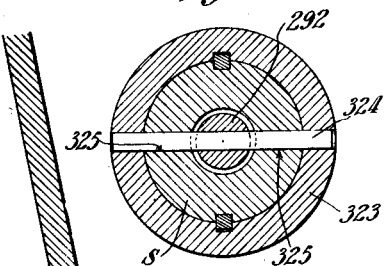
Figure 27:
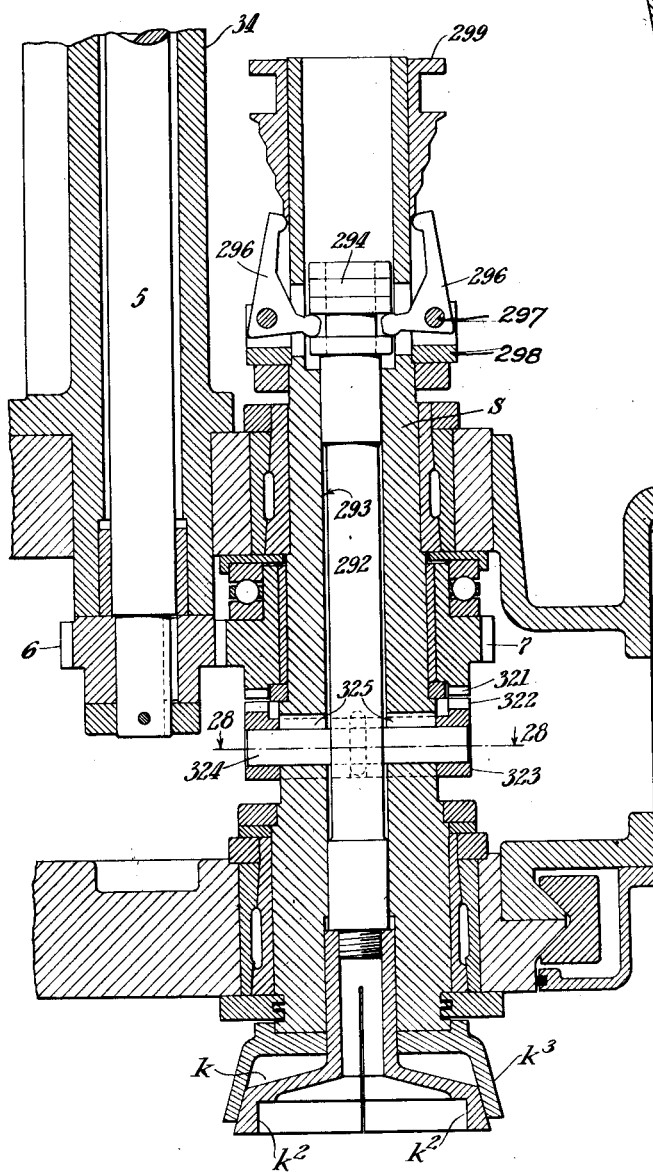

Fig. 1 is a rear elevation of a chucking machine embodying the present invention. Fig. 2 is a central vertical section through the base and the two spaced head supporting columns later to be described. Fig. 3 is a horizontal section on the line 3—3 of Fig. 2. Fig. 4 is a similar view on the line 4—4 of Fig. 2 showing more particularly a loading mechanism for the work-holding chucks. Fig. 5 is a section on the line 5—5 of Fig. 2 showing the mountings for and relative positions of the various tools. Fig. 6 is a vertical section through the machine head showing more particularly the work-spindle rotating means and the means for indexing the spindle-carrying turret. Fig. 6ª is a detail view, on a reduced scale, of a turret clamp later to be described. Fig. 7 is a horizontal section on the line 7—7 of Fig. 6. Fig. 8 is a horizontal section on the line 8—8 of Fig. 6, showing the means for opening and closing the work-holding chucks. Fig. 9 is a horizontal section on the line 9—9 of Fig. 6. Fig. 10 is a detail side elevation of one of the side tool heads and the means for supporting it on one of the columns of the machine. Fig. 11 is a vertical section on the line 11—11 of Fig. 10. Fig. 12 is a similar view on the line 12—12 of Fig. 10. Fig. 13 is a side elevation of another one of the side tool heads and the means for supporting it on one of the machine columns. Fig. 14 is a vertical section on the line 14—14 of Fig. 13. Fig. 15 is a horizontal section on the line 15—15 of Figs. 1 and 13 showing two of the side tool heads supported by one of the machine columns and the means for effecting movement of the tools into and out of operative position. Fig. 16 is a detail vertical section showing certain fluid pressure actuated means forming a part of the loading mechanism for automatically placing the work pieces in the chucks. Fig. 17 is a central vertical section on the line 17—17 of Fig. 2 illustrating the means for effecting reciprocation of the main tool head and the means for effecting micrometer adjustment of the carriage with respect to the work. Fig. 18 is a detail sectional view showing means for effecting individual adjustment of the tools in the main tool head. Fig. 18ª is a detail view, partly in section, of a work-piece such as may require the use of all six tools including the transversely movable tool shown in Fig. 13. Fig. 19 is a sectional development of the feed gearing. Fig. 20 is a view of the gear box with the cover removed. Fig. 21 is a section on the line 21—21 of Fig. 20 showing the trip mechanism for controlling the indexing and feed mechanisms. Figs. 21ª and 21ᵇ are detail views of certain elements of the trip mechanism shown in Fig. 21. Fig. 22 is an elevation of the gear box as viewed in the direction indicated by the arrow 22 in Fig. 20. Fig. 23 is a section on the line 23—23 of Fig. 22. Fig. 24 is a section on the line 24—24 of Fig. 23. Fig. 25 is a section on the line 25—25 of Fig. 24. Fig. 26 is a diagrammatic view illustrating the trains of mechanism for effecting slow and rapid translation of the tool heads, rotation of the work supporting spindles and indexing of the work-turret. Fig. 27 is a modification of one of the spindles and its actuating mechanism showing means automatically to disconnect the spindle from its rotating mechanism to permit removal and replacement of the work. Fig. 28 is a section on the line 28—28 of Fig. 27.

*General description of machine.*

Referring more specifically to the drawings, the invention is disclosed as embodied in a chucking machine comprising a base B, upon which are secured two upright hollow columns C and C' which house certain operating mechanism and support certain tool-slides later to be described. Upon the upper ends of the columns there is supported a head H within which is rotatably journaled a turret or roulette T carrying work-holding and rotating spindles S. Each of these spindles carries at its lower end a chuck $k$ to hold a work piece adapted to be operated on by suitable tools, as will hereinafter be described. Means to index the turret, successively to present the work carried thereby to the various tools, is located in a cap K supported on the head and is actuated at predetermined points in the cycle of operation from mechanism within a gear-box G supported by the column C. A turret lock is provided to prevent rotative movement of the turret during the machining operation and a suitable clamp secures the turret to the stationary feed and holds the turret against axial movement and vibration. Slidingly fitted upon vertically disposed guideways $q$ and $q'$ provided by the columns C and C' respectively, and located beneath the work-turret, is a main tool-slide or carriage M within which is secured a plurality of tool-holders $h^1$, $h^2$ and $h^3$, each of which may carry a tool adapted to act upon the work as it is successively presented thereto by the vertical reciprocation of the main tool carriage and the indexing movement of the work-holder. A primary side tool-head $S^1$ is mounted on the column C and carries a suitable translatable tool-slide $s^1$ fitted with a cutting tool $t^1$. Secondary and tertiary side tool-heads $S^2$ and $S^3$ are mounted on opposite sides of the column $C^1$ and carry suitable tools $t^2$ and $t^3$, respectively held in translatable slides $s^2$ and $s^3$. The tool-slide of the side head $S^2$ is preferably arranged to have movements in transverse directions to permit the tool carried thereby to be moved vertically into the work and then horizontally to effect a cutting operation. An automatic loading device is actuated in timed relation with the tool feeding mechanism and the turret indexing mechanism to present a new piece of work to the chucks after a preceding piece has been completed and dropped. This device comprises an automatic feed mechanism designated generally as F in Fig. 4 which receives a work-blank and moves it horizontally into vertical alignment with a fluid pressure actuated work-elevating mechanism L shown in Figs. 4 and 5. This mechanism elevates the work-blank and places it within the then-open work-chuck of one of the spindles S, after which the chuck is closed upon the work, and locked against opening, by fluid pressure actuated mechanism shown more particularly in Figs. 6 and 8.

*Operation of machine.*

A casing for ball bearings, such as is shown in Fig. 18ª, is one specimen of work which might require the use of all of the six tools. Supposing that such a piece of work is to be machined in this improved chucking machine, its operation is as follows:—A work blank is automatically or manually inserted in a work-chuck when at its blank-receiving station, i. e. above the automatic loading mechanism at position #1, Fig. 5. The turret clamp and lock are then released. The turret now makes a two-stage fractional turn; each step representing about half the distance between the spindles; each stage in this example being 45 degrees. This brings the loaded chuck (and the work-piece carried thereby) to position #2 above a suitable tool fixed in the first tool-holder $h^1$ carried by the elevatable main tool-slide M. The turret is now locked and clamped. A rapid traverse is then rendered effective to elevate the main tool carriage (as well as advance the side tool slides) to bring the tool in the holder $h^1$ (and the tool $t^1$ in the side-head slide $s^1$) rapidly into working position. The tools having been brought close to the work, the rapid traverse is discontinued and a slow feed into the work is rendered effective. This causes a tool in the holder $h^1$ to rough cut the bore $b$ (and the tool $t^1$ to chamfer the corner at $d$,) it being understood that the work is rotated as the tools are advanced.

When these cuts have been completed at this station the side tool is rapidly retracted and the main tool carriage is rapidly lowered. The work turret is unclamped and unlocked and given another two-stage turn, i. e., two partial rotations of 45 degrees each to carry the work piece to #3 position; whereupon the turret is again locked. The rapid traverse is again rendered effective to bring a facing tool (carried by tool holder $h^2$) into proximity with the lower face $e$ of the work and simultaneouly, the tool slide $s^2$ is traversed vertically upward to insert the tool $t^2$ (see Fig. 13) adjacent the bore of the work. The rapid traverse is then thrown out and the slow feed immediately thrown in. The tool in the holder $h^2$ is thus caused to rough cut the face $e$ while the tool $t^2$ is fed horizontally and cuts the ball-races $f$. At the completion of these cuts, the tool $t^2$ is first retracted horizontally to clear the ball races and thereupon both the tool $t^2$ and the tool carried in the holder $h^2$ are rapidly lowered to clear the work. The work turret is now unclamped, unlocked, indexed to #4 position and again clamped and locked as above described. In this latter position, a tool carried by tool-holder $h^3$ finish cuts the bore $b$ and the tool $t^3$, carried by the side-head slide $s^3$, may finish cut the lower face $e$ of the work; the rapid traverse and slow feed alternately being actuated as previously indicated; to wit, to bring the tools into contact with the work, to perform the finishing operations, and to retract the tools from the work. The next 45 degree index of the work turret carries the loaded chuck to a position designated as #5 (intermediate the positions #1 and #4) where the turret halts. During the dwell, the chuck is automatically forced open and the finished work-piece falls therefrom by gravity and may be removed from the machine in any suitable way, such for example, as by a chute. The next rotation of the work turret (of 45 degrees) again places the chuck in position #1 where it receives a new work blank for a subsequent operation. It is to be understood that the tools at the positions #2, #3 and #4 are simultaneously performing successive operations on similar work-pieces and that alternate partial rotations of the work-turret of 45 degrees brings a completed work-piece to position #5 where it is released and removed from the machine.

*Flow of motion to various mechanisms.*

The flow of motion for effecting rotation of the work-holding chucks, indexing of the work-turret, unlocking and clamping of the work-turret, fast and slow reciprocation of the tools, feeding of the work-blanks, and the gripping of the work blanks by the chucks can best be understood by keeping in sight the diagram depicted by Fig. 26. Power to effect these various movements may be provided by a motor, or other prime mover P preferably secured upon the cap K at the top of the machine. Rotation of the spindles S (which carry the work chucks $k$) is effected from a shaft 1 journaled horizontally in the cap K and driven from the prime mover by suitable sprocket wheels 2 and 3 and a connecting chain 4. Power is taken from the shaft 1 by suitable gearing, later to be described, and is transmitted to a spindle drive-shaft 5 journaled coaxially with the work-turret T. This drive shaft carries a pinion 6 which meshes with and drives a gear 7 carried by each of the work spindles, thus all of the spindles are rotated continuously from the prime-mover.

The shaft 1 also carries a sprocket-wheel 8 (see Figs. 1, 9 and 26) which is connected, by a chain 9, to a similar sprocket wheel 10 fixed to a short shaft 11 journaled in a bracket 12, secured upon the machine head. This latter shaft is connected by bevel gears 13 and 14 to a vertically disposed shaft 15 which, at its lower end, enters the gear box G and has secured to it a bevel gear 16 which drives a similar gear 17 loosely journaled on a shaft 18. For convenience of assembling and to permit ready removal of the gear-box as a unit the shaft 15 may be made in two parts $15^a$ and $15^b$, connected together by a sleeve $15^c$, as shown in Fig. 23. A clutch spool 19, splined to the shaft 18, may be shifted manually to the right as viewed in Fig. 26, to effect a drive from the gear 17 to the shaft 18 or it may be shifted to the left to establish a drive from a manually rotatable shaft $m$, through gears 54 and 45 to the shaft 18 to permit manual adjustment of the tool-slides. Power is taken from the shaft 18 and transmitted intermittently through suitable gearing, later to be described, to a shaft 20 extending upwardly from the gear-box into the head H, and also to a shaft 21 journaled within the column C. The intermittent rotation of the shaft 20 effects, through a Geneva mechanism, designated generally as V, and suitable gearing, step-by-step rotations, of 45 degrees each, of the work-turret. The shaft 20 also carries three cams 22, 23 and 24 which effect, respectively, opening of the work chucks, locking of the work-turret against rotation, and clamping of the turret to the stationary head during the tooling operations to eliminate vibration, etc. The automatic work-blank feeding mechanism F also is actuated by the intermittent rotation of the shaft 20 in timed relation with the step-by-step movements of the turret. The shaft 21 drives, by gearing designated generally as $x$ in Fig. 26, a cross shaft 25 which is connected by gears $y$ to a shaft 26, journaled vertically within the column C'. Shafts 21 and 25 are operatively connected to rotate suitable barrel cams 27 and 28 which effect, respectively, horizontal reciprocation of the primary side tool-slides $s'$ and vertical reciprocation of the main tool-slide M. The shaft 26 likewise rotates barrel cams 29 and 30 of which the former effects both vertical and horizontal movement of the secondary side tool-slide $s^2$ and the latter effects horizontal reciprocation of the tertiary side tool-slide $s^3$. The speed of rotation of the shafts 21, 25 and 26, and thereby the rate of movement of the tool-slides, is automatically controlled in the speed-box which provides a rapid traverse train to move the tools into and out of operative position and a slow feed train to effect the cutting stroke of the tools. These trains are alternately rendered effective by the shifting of a clutch member 31, by mechanism designated generally as $w$, as will hereinafter be more fully described.

To effect the proper coordination between the rapid traverse mechanism and the turret indexing mechanisms these mechanisms are arranged to be effective alternately. This is attained by controlling both of said mechanisms by a single clutch member 32 which, when in one of its operative positions renders the indexing mechanism effective and, when in its other operative position disconnects the drive to the indexing mechanism and connects the drive to the rapid traverse. The clutch member 32 is shifted to the right (as viewed in Fig. 26) to connect it with the rapid traverse drive gear by means actuated in timed relation with the indexing mechanism and designated generally as $z$, and in the opposite direction to render effective the indexing mechanism by means actuated in timed relation with the feed and designated as $z^1$. Also actuated from the feed gearing, as will later be described, is a valve $v'$ which controls the flow of fluid to the work-blank elevating mechanism L which takes the work-blanks from the feeding mechanism and places them in the work-chucks, and a valve $v^2$ which controls the flow of fluid to a chuck-closing mechanism.

*Work-spindle rotating means.*

As hereinbefore explained the work-blanks are held in chucks $k$ carried by suitable spindles rotatably journaled in the turret T. (See Figs. 6 and 7.) These spindles are arranged symmetrically around the axis of the spindle drive-shaft 5 and each spindle has keyed to it a gear 7 which is driven by the gear 6 on said drive shaft. The shaft 5 is rotatably journaled in bearings 33 provided by a reinforced tubular turret-supporting member 34 secured at its lower end to the turret T as by bolts 35 and having its upper end journaled in a bearing 36 supported by the cap K. The weight of the turret and the parts carried thereby is supported by the cap K as by means of a thrust bearing $34^a$ interposed between the cap and a collar $35^b$ fixed to the upper end of the tubular member 35. At its upper end the shaft 5 carries a bevel gear 37 which is driven by a bevel pinion 38 fixed upon a shaft 39 journaled in bearings 40 also provided by the cap. Removably secured upon the outer end of the shaft 39 is a gear 41 which meshes with and is driven by a gear 42 removably secured upon the shaft 1 which is driven from the prime-mover by means hereinbefore described. These gears may be removed from their respective shafts and replaced by another pair having a different ratio, whereby various speeds of rotation may be obtained in the work spindles from a single speed in the prime-mover. The pick-off gears 41 and 42 are preferably housed within a casing 43, supported by the cap K, and closed by a cover plate 44.

*Rapid traverse and slow feed for tool slides.*

The tools are moved into contact with the work, given a cutting stroke, and removed from the work by the bodily movements of the tool slides M, $s^1$, $s^2$ and $s^3$ which receive their movements from rotary cams 28, 27, 29 and 30 respectively. These cams are rotated indirectly from the shafts 21, 25 and 26 and the rate of movement of the tool carriages is determined by the speed of rotation of those shafts.

Within the gear-box G is a rapid traverse gear-train and a slow feed gear train and these trains are rendered effective in a predetermined sequence by the automatic shifting of the clutch member 31, hereinbefore referred to. As previously stated, power enters the gear-box through the shaft 15 and is transmitted to the shaft 18 through bevel gears 16 and 17, and manually shiftable clutch spool 19 splined to the shaft 18. This spool is provided at one end with clutch teeth $19^a$ adapted to engage similar teeth 17ª provided by the gear 17 to effect a power drive into the shaft 18, and at the opposite end with clutch teeth 19ᵇ adapted to engage teeth 45ᵇ formed on the hub of a gear 45 rotatably journaled on the shaft 18. As shown in Figs. 22 and 25, the spool 19 may be shifted axially of the shaft 18 by a suitable clutch shifter 46 fulcrumed upon a stud 47 fixed in a wall of the gear box. The clutch shifter 46 is connected by a link 48 to an arm 49 fixed upon a rock shaft 50 journaled adjacent one end in the gear box and adjacent the other end in a bracket 51 supported by the gear box. The outer end of the shaft 50 carries a crank-arm 52 to which is attached a bar 53 which, when manually shifted in the direction of its length will cause the clutch spool 19 to be engaged either with the power driven gear 17 or the gear 45. The latter gear meshes with a gear 54 on the manually rotatable shaft m whereby the tool slides may be adjusted manually when the clutch spool is clutched to the gear 45. With the spool 19 clutched to the gear 17, power is transmitted to the shaft 18 and to the gear 55 secured thereto, which in turn drives a gear 56 splined to a shaft 57 journaled in the gear box, parallel with the shaft 18, (see Fig. 19). The gears 55 and 56 are common to both the rapid traverse and the slow feed, now to be described.

Rapid rotation of the shafts 21, 25 and 26 (and thereby rapid translation of the tool carriages) is effected by establishing a drive directly from the shaft 57 to a shaft 58 also journaled in the gear-box. To this end, intermeshing gears 59 and 60 are rotatably journaled upon the shafts 57 and 58, respectively, and the teeth 31ª and 32ª of the shiftable clutch members 31 and 32 may be engaged with clutch faces 60ª and 59ª respectively of the gears 60 and 59 to lock them each to its respective shaft. From the shaft 58 the power flows to the shafts 21, 25 and 26 as will hereinafter be described.

Slow rotation of the shafts 21, 25 and 26 (and thereby slow feeding movements of the tool carriages) may be effected from the shaft 57 by a suitable train of gearing also located within the gear box G. When the slow feed is to be effected the clutch-member 31 shifted to the left, as viewed in Figs. 19 and 26, to disengage it from the gear 60 and to engage its clutch-teeth 31ᵇ with clutch teeth 61ᵇ on a gear 61 loosely journaled on the shaft 58. This clutching of the member 31 with the gear 61 completes a slow drive from the shaft 57 to the shaft 58 through gears 62, 63, 64, 65, shaft 66 and gears 67, 68, 69, 70, 71 and 61 and the splined clutch member 31. The gears 62, 63, 64 and 65 are preferably located exteriorly of the gear box within a compartment p and are so secured to their respective shafts that they may be readily removed and replaced by gears of different ratio to vary the rate of the slow feed from a constant speed in the prime-mover. A door D may be hinged upon the gear box to close the compartment p and yet afford ready access to the pick-off gears 62, 63, 64 and 65. The clutch member 31 is shifted automatically in timed relation with the reciprocation of the tool-slides by mechanism designated generally as w in Fig. 26 and shown more in detail in Figs. 19, 22, 23 and 26. Fixed upon the shaft 58, so as to rotate therewith under the action of both the rapid traverse drive and the slow feed drive, is a gear 72 which meshes with and drives a similar gear 73 secured upon a shaft 74 rotatably journaled in the gear-box. To the shaft 74 is fixed a worm 75 which drives a worm-wheel 76 secured upon a shaft 77, also journaled in bearings in the gear box. This latter shaft has fixed upon it, at one end, a disk 78 formed, adjacent its periphery with a plurality of apertures 78 adapted to receive the supporting shanks of studs or rollers 79 and 80 which are arranged at the opposite sides of said disk and which serve to trip into action the rapid traverse and slow feed; respectively as will presently be described. The shaft 77 also actuates mechanism to shift the clutch member 32 to effect indexing of the work-turret.

The clutch member 31, which renders effective either the rapid traverse or the slow feed, is engaged by a shifting yoke 81 fixed upon a shaft 82 mounted for oscillatory movements in bearings provided by the gear box. Also fixed to this shaft is an arm 83 which is connected by a link 84 with a similar arm 85 secured upon a short shaft 86 journaled in bearings in the gear box. An arm 87 is loosely journaled upon the shaft 86 and has pivotally attached to its lower end two links 88 and 89 which connect to levers 90 and 91 respectively fulcrumed intermediate their ends upon stud screws 92 and 93 threaded into bosses projecting from the gear box. The lower ends of the levers 90 and 91 are arranged in the paths of the rollers 79 and 80 respectively carried upon opposite faces of the disk 78 and upon rotation of the disk in a counter-clockwise direction as viewed in Fig. 22, the rollers will alternately engage said levers and swing them about their fulcrums which, through the links 88 and 89 effect oscillation of the arm 87. As before stated the arm 87 is loosely journaled upon the shaft 86 but the oscillatory movements of said lever are adapted to be transmitted to the shaft, to effect shifting of the yoke 81, by means of a lost-motion connection with an arm 94 fixed to said shaft. To this end, the arm 87 has a projection 87ª providing spaced stops 87ᵇ and 87ᶜ arranged at opposite sides of a portion 94ª of said arm 94. The projection 87ᵃ is formed with inclined cam faces 87ᵈ and 87ᵉ which, upon oscillation of the arm 87, alternately act to depress a spring pressed plunger 95 and then to be acted upon by said plunger to further shift the arms 87 and 94 and thereby the clutch shifting yoke 81. The rollers 79 and 80 acting upon the levers 90 and 91 serve to shift the arms 87 and 94 sufficiently far positively to disengage one end of the clutch member 31 from its cooperating clutch face but the engagement of the other end of the clutch member with the other cooperating clutch face is effected impositively by the action of the spring plunger on either of the cam faces 87ᵈ or 87ᵉ.

The roller 79 acts upon the lever 90 and shifts the clutch member 31 to effect rapid traverse of the tool slides and the roller 80 likewise acts upon the lever 91 to effect the slow cutting feed. The studs of the rollers 79 and 80 are adapted to be secured within any of the apertures 78ᵃ in the disk 78 and therefore any desired sequence of operation of the rapid traverse and slow feed may be obtained. Inasmuch as the levers 90 and 91 act upon the arm 87 in opposite directions it is obvious that they may not both be actuated simultaneously to shift the clutch member 31. To prevent the operator from so setting the rollers 79 and 80 that they would engage the levers 90 and 91 at the same time, the stud of the roller 80 is attached to one end of an arm 96 pivoted upon the shaft 77 and held thereon by a collar 97. The other end of the arm constitutes an interference member 96ᵃ which, when the stud of the roller is inserted in certain ones of the apertures 78ᵃ, overlies one or more of the apertures at the opposite edge of the disk 78 and prevents attachment of the roller 79 to the disk in such a position that would cause simultaneous actuation of the traverse and feed control levers 90 and 91. For convenience of illustration, the rollers 79 and 80 are shown in Fig. 23 in positions which they would not occupy in the actual machine. From the foregoing it will be perceived that means is provided for automatically effecting both rapid and slow rotation in the shaft 58 in a predetermined sequence. The shaft 58 carries a bevel gear 98 which drives a similar gear 99 formed integral with a spur gear 100 rotatably journaled on a stud 101 fixed in a bracket 102 projecting from the side of the gear box. The gear 100 drives a gear 103 fixed to the upright shaft 21 journaled within the column C. Adjacent its upper end the shaft 21 has fixed to it a gear 104 which meshes with and drives a gear 105 secured upon a shaft 106 journaled in bearings provided by a base 107ᵇ which supports the side tool head S¹, as will later be described. (see Figs. 2, 5, 10 and 11). This base member is secured upon the front face of the column C and has a portion projecting through an opening c' therein. This inwardly projecting portion supports the bearings for the shaft 106 and also bearings for a horizontally disposed shaft 107 upon which is secured a worm wheel 108 driven from a worm 109 on the shaft 106. The shaft 107 also supports the barrel cam 27 which effects translation of the side tool head S¹.

Power is taken from the shaft 21 and transmitted to the horizontal shaft 25 by gearing designated generally as $x$ in Fig. 26 and shown more in detail in Fig. 2. This gearing comprises a bevel gear 110, fixed upon the lower end of the shaft 21, which drives a similar gear 111 secured upon a shaft 112 journaled horizontally in bearings provided by the lower portion of the column C. A spur gear 113 fixed to the shaft 112 drives a similar gear 114 secured to the shaft 25 thereby completing the drive from the shaft 21 to the shaft 25.

For convenience of assembling and to permit ready removal of a bearing bracket 115 for reasons later to be explained, the shaft 25 is preferably made in three sections, viz 25ᵃ, 25ᵇ, and 25ᶜ connected together by couplings 116 and 117. The section 25ᵇ is rotatably journaled in the bearing bracket 115 and has secured to it a worm 118 which drives a worm-wheel 119 (see Fig. 17) fixed upon a shaft 120 upon which is secured the barrel cam 28 which effects reciprocation of the main tool carriage M. The shaft section 25ᶜ is located within the base of the column C¹ and has secured upon it a gear 121 which drives a gear 122 secured upon a shaft 123 also journaled in the column C¹. Power is transmitted from the shaft 123 to the shaft 26 journaled vertically in the column C¹ by bevel gears 124 and 125. The gears 121, 122, 124 and 125 are designated generally as $y$ in Fig. 26. Adjacent its upper end the shaft 26 has secured to it gears 127 and 128 which mesh respectively with gears 129 and 130 constituting a part of the translating means for the tool slides of the side heads S² and S³ respectively (see Figs. 2, 5, 14 and 15). The gear 129 is fixed upon a shaft 131 journaled in the base 132 of the secondary side head S² and within this base is also journaled a shaft 133 which is driven from the shaft 131 by bevel gears 134 and 135. A worm 136, on the shaft 133, drives a worm-wheel 137 fixed to the barrel cam 29 rotatably journaled on a pin 138 fixed in the base 132. The gear 130 is secured to a vertically disposed shaft 139 journaled in the base 140 of the tertiary head S³, and upon this shaft is fixed a worm 141 which drives a worm wheel 142 fixed to the side-head translating cam 30. This cam is rotatably journaled on a pin 143 fixed in the base 144 of the side head S³.

The base members 132 and 144 of the side heads S² and S³ are secured upon the front and rear faces, respectively of the column C¹ and project through apertures C² and C³ to the inside of the column where they carry the actuating mechanism above described.

*Side tool heads.*

The primary and tertiary side tool heads S¹ and S³ are similar in construction and are interchangeable. Detail description of the primary head is therefore deemed sufficient for both. Referring to Figs. 5, 10, 11 and 12 it will be seen that the primary side head comprises a base 107ᵇ removably secured to the column C by means of bolts 145. This base has a portion projecting through the aperture C' and supports, within the column, the gear 105, shafts 106 and 107, worm 109 and worm wheel 108 hereinbefore referred to. The base is formed with horizontally disposed guideways 107ᶜ and 107ᵈ within which is slidably fitted the tool-slide $s^1$ which carries at its rear side, a stud or roller 107ᵉ, adapted to track the groove in the cam 27. The roller is preferably adjustable relative to the slide $s^1$ as is shown more clearly in Fig. 15 with reference to the tertiary side head S³. To permit adjustment between the roller and the tool-slide the roller is preferably secured to a plate 146 located at the rear side of the base plate and adapted to be clamped thereto in adjusted positions by clamp screws 147 passing through slots 148 in the tool-slide and threaded into the plate 146. A screw 149 rotatably but non-translatably held in a laterally projecting plate 150, secured to the plate 146, is threaded into the tool-slide and provides a micrometer adjustment between the slide and the plate. Thus by rotating the screw 149 the tool-slide and the tool carried thereby may be adjusted toward and from the work without varying their working stroke under the action of the cam groove.

The tool-slide $s^1$ is formed with vertically disposed T-slots 151 adapted to receive the head of clamp bolts 152 which serve to clamp to the side of said slide a tool-head 153. A screw 154, rotatably but non-translatably supported by the tool-slide, is threaded into the tool-head and provides a micrometer adjustment for the tool-head transverse to the adjustment provided by the screw 149. Any suitable tool $t^3$, as may be required by the nature of the operation to be performed, may be inserted within the tool-head 153 and held therein by set screws 155.

The secondary tool head S² is adapted to effect undercutting operations and therefore it is necessary that the tool carried thereby be moved in transverse directions. This necessitates that this head be constructed somewhat differently from the primary and tertiary heads. This head is shown in detail in Figs. 13, 14 and 15 to which reference may now be had. The means for supporting the head on the column C' and the means for supporting and rotating the cam cylinder 29 have already been described and therefore will not be repeated. The cam cylinder 29 is formed with two cam grooves, 29ª and 29ᵇ tracked, respectively, by rollers or studs 29ᶜ and 29ᵈ of which the former is carried by a saddle $s^5$ translatably mounted on vertically disposed undercut ways 156 formed in the base 132, thus rotation of the cam will cause the saddle $s^5$ and everything carried thereby to be translated vertically. Intermediate the saddle and the cam-cylinder the base 132 is formed with a vertical guideway 157 within which is slidingly fitted a block 158 which supports, at one face, the roller 29ᵈ. This block is provided in its opposite face with a cam groove 159 which is tracked by a roller 160 carried by a plate 161 adjustably secured, as by an adjusting screw 162 (similar to the screws 149 and 154) and clamp screws 163, to the tool slide $s^2$ which is slidingly fitted within horizontally disposed ways $s^e$ formed in the saddle. A tool-holder 164 is adjustably mounted on the tool-slide by means of T-slots 165, clamp bolts 166, and adjusting screw 167 and may carry any suitable tool $t^2$. From the foregoing, it will be understood that rotation of the cam cylinder 29 will, through the cam groove 29ª, roller 29ᶜ, and saddle $s^5$, effect vertical movement of the tool-slide $s^2$, tool-holder 164 and the tool carried thereby. Likewise the cam groove 29ᵇ and roller 29ᵈ will effect vertical translation of the block 158 and this movement will, by means of the cam groove 159 and roller 160, be converted into horizontal translation with the tool slide $s^2$ and parts carried thereby. The side tool-heads S¹, S² and S³ are each formed with an oil reservoir R from which oil may be taken and conducted to the various bearing surfaces by suitable wicks, not shown.

*Main tool-head.*

The main or lower tool-head M is formed as a unitary structure and is translatably mounted between the columns C and C' by being fitted to guides $g$ and $g'$ provided thereby. Suitable straps $j$ and gibs $j^2$ serve to effect a sliding fit between the head and the columns and permit bodily removal of the head from the columns. This head is a box-like structure of which the lower or body portion 168 is substantially C-shaped as shown in Fig. 3. This arcuate body portion is surmounted by a substantially circular head 169 upon which are secured three tool holders $h^1$, $h^2$ and $h^3$ spaced ninety degrees apart on a common radius. These holders lie directly beneath the work-holders $h$ when the latter are in their operative positions. A portion of a work loading mechanism is arranged on the same radius as the tool holders and occupies the fourth position or in other words is located ninety degrees from the two diametrically opposite tool holders. This mechanism is supported by the main tool slide M as will hereinafter be described. Various forms of tools may be held in the tool holders, the form of the tool used being dependent upon the nature of the operation to be performed.

Individual vertical adjustment is provided for the tool of each holder and this is preferably effected by the means shown in Fig. 18. The tool, or a supplemental tool-holder or adapter, is preferably vertically movable in each of the tool-holders $h^1$, $h^2$ and $h^3$ and rests upon a translatable but non-rotatable screw 170. This screw is threaded through a nut 171 rotatably but non-translatably journaled in a bracket 172 secured upon the periphery of the circular head portion 169 of the main tool head and projecting into an orifice formed therein. A manually rotatable shaft 173 is journaled in the bracket 172 and has fixed to it a bevel gear 174 which drives a similar gear 175 fixed to the nut 171. Thus it will be seen that rotation of the shaft 173 as by means of a crank applied to the squared projecting end $173^a$ thereof will effect micrometer adjustment of the tool. A graduated dial 176 fixed to the shaft 173 indicates the amount of adjustment effected.

The entire head M is reciprocated vertically on the ways $g$ and $g'$ (first to move the tools to the work, then to effect the cutting feed and lastly to retract the tools to their initial position) by the action of the cam groove $28^a$ in the cam cylinder 28. This cam acts upon a roller or stud 177 normally fixed relative to the main tool slide M and therefore rotation of the cam, by the means hereinbefore described, will effect vertical movements of the roller and thereby the tool slide. The rate of reciprocation will be dependent upon the contour of the cam groove and the speed of rotation of the cam cylinder 28. Means also is provided for effecting vertical adjustment of the main tool slide and the tools carried thereby without varying their extent of reciprocation by the cam groove. This is effected by having the roller 177 carried by a slide-bar 178 slidingly fitted to ways 179 provided by the central web $168^a$ of the member M. A screw 180, rotatably but non-translatably journaled in a bracket 178 is adapted to be rotated from a manually rotatable shaft 182 by bevel gears 183 and 184. Thus it will be seen that rotation of the screw will cause it to move axially in the slide-bar and this movement is transmitted to the main tool-head. A graduated dial 185 fixed to the shaft 182 indicates the amount of adjustment made.

The cam cylinder 28 is preferably made of two semi-cylindrical portions $28^b$ and $28^c$ secured upon a cam-supporting cylinder 186 by screws 187 (see Fig. 3) and therefore may be removed and replaced by another cylinder having a cam-groove of different contour when it is desired to vary the stroke of the tool slide M, as may be required by the nature of the work to be machined. The cam-supporting cylinder 186 is secured to the shaft 120 journaled in the bracket 115. This bracket, cam, worm-wheel 119, worm 118 and the shaft section $25^b$ comprise a unitary structure which readily may be moved rearwardly away from the main tool head M and from between the columns to permit removal and replacement of the cam cylinder portions $28^b$ and $28^c$ and to afford access to certain normally inaccessible mechanism for the purpose of inspection and repair.

To permit removal of the bracket 115, and the parts carried thereby, it is necessary to separate the shaft sections $25^a$ and $25^c$ from the section $25^b$. To that end, the sections $25^a$ and $25^c$ are journaled at their outer ends in bearing brackets $25^f$ and $25^g$ removably secured to the columns C and C' respectively. By removing these brackets the shaft sections journaled therein may be drawn outwardly to disconnect them from the couplings 116 and 117.

Turret indexing mechanism.

As hereinbefore stated, the work turret T is indexed between successive operations to carry the work from one station to the next. This is effected by means now to be described. To an annular flange $34^c$ on the turret supporting member 34 is secured a gear 188 which is driven by a gear 189 fixed to the hub of a Geneva wheel 190 rotatably journaled in bearings 191 provided by the cap K. The ratio of the driving gear 189 to the driven gear 188 is as one to two therefore necessitating two complete rotations of the Geneva wheel, and the gear 189 carried thereby, to effect one complete rotation of the work turret. The Geneva wheel is provided with four radial slots 192 which are successively engaged by rollers 193 carried by a cross-arm 194 fixed upon the vertical shaft 20, driven from gearing in the gear-box. Each of the rollers 193 will, by its engagement with one of the slots 192, give the Geneva wheel a rotation of ninety degrees and inasmuch as this wheel is geared to the turret by a two to one drive the turret will be indexed in steps of forty-five degrees each. Inasmuch as the tools in the main tool carrier and also in the side heads are arranged ninety degrees apart it will be apparent that alternate movements of the turret will place the work in position to be operated by the tools. The intermediate stops are provided so that each chuck may be opened, and the finished work removed therefrom, as it reaches station #5 which is midway between station #4, where the final operation is performed on the work, and the loading station #1, as is shown in Fig. 5. This stop, is, however, only momentary.

The drive for the shaft 20 begins with a gear 195, loosely journaled in the continuously rotating shaft 57 in the gear box, and is adapted, at predetermined times, to be clutched thereto by the clutch-member 32 which is provided at one end with clutch teeth $32^b$ adapted to engage clutch teeth $195^b$ provided by the gear 195. This gear drives a similar gear 196 secured upon a shaft 197 also journaled in the gear-box. A worm 198 secured upon the shaft 197 meshes with and drives a worm-wheel 199 fixed upon a short shaft 200 journaled vertically in the gear box, as shown in Fig. 23.

The shaft 200 is, in effect, a continuation of the shaft 20 but to permit ready removal of the gear-box, and the mechanism carried thereby, as a unit, they are made separate and are operatively connected together by gears 201, 202 and 203 of which the former is fixed to the shaft 200 and the latter is fixed to the shaft 20. The intermediate gear 202 is journaled in a bracket carried by the gear box and may be located after the gears 201 and 203 have been put in place, thereby affording convenient means for correcting any slight inaccuracies in manufacture in either the head H or the gear box.

To produce a substantial delay in the rotation of the turret, thereby to permit the tools at stations #2, #3 and #4 to perform their respective operations on the workpiece, the shaft 20 and the cross-arm 194 are brought to rest after alternate indexes of the turret. Inasmuch as the intermediate indexes of the turret are solely for the purpose of permitting removal of the completed work from the work chuck then located at position #5 this stop may be only momentary and therefore rotation of the shaft 20 and the cross-arm is permitted to continue.

It is to be remembered that the tooling operation is performed during the time that the turret is at rest therefore the tool feeds and the indexing mechanism operate alternately. Rotation of the shaft 20 is arrested by shifting the clutch member 32 so as to disconnect the clutch teeth $32^b$ thereon from the clutch teeth $195^b$ on the gear 195. This is effected automatically by means now to be described.

The clutch-member 32 is formed with an annular groove which is engaged by a clutch-shifting fork 204 fixed upon a shaft 205, journaled in bearings provided by the gear box (see Figs. 24 and 25). Thus oscillation of the shaft 205 in one direction will cause the clutch-member 32 to be shifted to the left as viewed in Figs. 19 and 26 to connect it with the gear 195 thereby to actuate the indexing mechanism, and oscillation of the shaft in the opposite direction will shift the clutch member into engagement with the rapid traverse drive gear 59. As hereinbefore stated the clutch member 32 is adapted to be shifted in opposite directions by two mechanisms designated generally as $z$ and $z'$ (in Fig. 26) actuated by the drive for the indexing mechanism and the feed controlling mechanism respectively. Referring now more particularly to Figs. 21, 23 and 25 it will be seen that the shaft 205 has secured to it, at one end, an arm 206, the free end of which is located between spaced stops $207^a$ and $207^b$ provided by another arm 207 loosely journaled on the shaft 205. This latter arm is connected by a link 208 to one arm $209^a$ of a three armed lever 209, fulcrumed upon a stud 210, threaded into a boss on the gear-box. It will readily be perceived that oscillation of the lever 209, by mechanism later to be described will, through the link 208, effect oscillation of the arm 207 which, by means of the stops $207^a$ and $207^b$, will move the arm 206 and oscillate the shaft 205 and shift the clutch member 32. The arm 207 is formed at one end with inclined faces $207^c$ and $207^d$ which cooperate with a spring pressed plunger 250 which serves both as a detent and also as means to effect impositive final actuation of the clutch member 32 as will hereinafter be described. A gear 211 is fixed to the turret index drive shaft 200 which meshes with and drives a similar gear 212 fixed upon a short shaft 213 journaled at one end in a bearing bracket 214 secured to the gear box and at its other end in a bearing provided by a cover-plate 215 which closes a compartment $n$ which houses the mechanism for oscillating the shaft 205. Keyed to the shaft 213 is the hub of a two-armed member 216 of which one arm carries a pin 217 which is so arranged that in its travel it engages a shoulder 218 formed on the hub of an arm 219 loosely journaled on the shaft 213 behind the member 216. A stop-pin 220 is carried by the hub of the arm 219 and is noramlly maintained in contact with a shoulder 221 on the arm 216 (as shown in Fig. 21$^a$) by a contractile spring 222 connected at one end to the pin 220 and at its opposite end to a pin 223 in the other arm of the member 216. Rotation of the shaft and member 216 in a counter-clockwise direction, as viewed in Figs. 21 and 21$^a$, causes the arm 219 (under the pull of the spring 222) to be brought into contact with a roller 224 carried by an arm $209^b$ of the three-armed lever 209. Inasmuch as the lever 209, link 208, and arm 207 are then maintained immovable by the action of the plunger 250 on the inclined face $207^d$ of the member 207, rotation of the arm 219 will be arrested while the member 216 continues to rotate with the shaft 213. This relative rotation between the member 216 and arm 219 extends the spring 222 as shown in Fig. 21$^b$ and brings the pin 217 into contact with the shoulder 218 whereupon further rotation of the shaft 213 and member 216 will cause the arm 219 to move therewith, thereby forcing outwardly on the roller 224 and rotating the lever 209 clockwise. This movement of the lever 209 draws downwardly on the link and rotates the arm 207 (in opposition to the spring plunger 250) and thereby the arm 206, which, through the mechanism described shifts, the clutch member 32 to disengage the clutch teeth 32$^b$ and 195$^b$ thereby stopping the rotation of the feed index gearing the shafts 200 and 20. The arm 219 in passing the roller 224 shifts it, and the parts actuated thereby, sufficiently to carry the apex between the inclined faces 207$^c$ and 207$^d$, of the arm 207, slightly beyond the point of the plunger 250 which then acts, under the influence of its spring, upon the inclined face 207$^c$ and shifts the parts a further distance, thereby engaging the teeth 32$^a$ of the clutch member 32 with the teeth 59$^a$ of the rapid traverse feed gear 59 thereby rendering effective the rapid traverse for the tool slides. It is to be remembered that the clutch member 31 was again shifted back into engagement with the rapid traverse gear 60 to retract the tool slides after the slow feed was completed and before actuation of the indexing mechanism began.

As the arm 219 clears the roller 224, the spring 222 contracts, thereby quickly shifting the arm 219 into the position represented in dot-dash lines in Fig. 21$^b$ with the pin 220 in engagement with the shoulder 221 in which position the parts come to rest. This final movement of the arm 219 is provided to remove it out of the path of the roller 224 which later will be shifted in the opposite direction by the clutch shifting mechanism Z$^1$.

The shaft 77 which controls the shifting of the rapid traverse and slow feed clutch member 32 carries at one end a fixed member 225 and an arm 226 connected together by an expansile spring 227. These parts are the same in construction and operation as the member 216, arm 219 and spring 222 and therefore detailed description is deemed unnecessary. The arm 226 is adapted to engage a roller 228 on the arm 209$^c$ of the three armed lever 209, and is so arranged that when the tool slides have been retracted by the rapid traverse after the tooling operation, it shifts the lever 209 counter-clockwise as viewed in Fig. 21, thereby shifting the clutch member 32 from its rapid traverse position (i. e., in engagement with the gear 59) into engagement with the clutch teeth of the gear 195 to actuate the index drive.

Turret lock.

After alternate indexes of the work turret, i. e., after each movement thereof that places the work in position to be operated on by the various tools, the turret is automatically locked against rotation. This is effected by mechanism shown in Figs. 6 and 7. A locking bolt 229 is slidingly fitted within a suitable casing 230 supported by the head H, and is normally pressed toward the turret by an expansile spring 231. The forward end of the bolt is tapered and enters, successively, four similarly shaped apertures 232 (which for convenience of manufacture are formed in blocks 233) carried by the turret and spaced ninety degrees apart. Due to the shape of the forward end of the block and the cooperating apertures the turret will not only be locked against rotation but it will also be very accurately located in each of its four operative positions. Retraction of the bolt to permit the succeeding index is effected by a lever 234 fulcrumed intermediate its ends on a screw 235 threaded into a horizontally disposed wall provided by the head H. One end of this lever enters a notch 236 in the bolt and the opposite end carries a roller 237 which tracks the periphery of the cam 23, rotatable with the shaft 20. The cam is so timed that just prior to the indexing movement of the turret it swings the lever 234 and retracts the bolt. The circumferential portion 23$^a$ of the cam disk then maintains the lever shifted and the bolt retracted while the turret is given its two stage index of forty-five degrees each, for a purpose hereinbefore explained, and as the next succeeding aperture 232 approaches the bolt the cam releases the lever and permits the bolt to be moved, under the influence of the spring 231. The end of the bolt may ride for an instant on the periphery of the turret and immediately the aperture is brought into alignment with the bolt the latter will be given a further movement by the spring to project the tapered end into the aperture thereby locating and locking the turret.

This lock safeguards the indexing mechanism against strains and preserves its initial precision. The clamping and unclamping of the chucks naturally requires considerable force and it is noted that the insertion and removal of the work is accomplished in but a brief interval and yet while the turret is locked so that the Geneva stop device is not obliged to carry any proportion of these strains.

Turret clamp.

In addition to the locking means just described which effectively locks the turret against rotation, there is also provided means to maintain the turret absolutely rigid during the tooling operation, thereby eliminating all possibility of vibration which otherwise might occur due to the fact that the turret must be journaled in the head sufficiently loose to permit its ready rotation. This means preferably comprises a clamp device adapted to grasp both the turret and the stationary head within which the turret is rotatably mounted and to draw them forcibly together. This clamp may comprise two semi-circular members 238ᵃ and 238ᵇ (see Figs. 6 and 6ᵃ) hinged together at 239 and having inner grooves 240, the walls of which diverge outwardly from their medial plane. These semi-circular members are fitted to annular flanges 241 and 242, formed on the head H and on the turret respectively, the walls of which are inclined in accordance with the inclination of the walls of the grooves 240 of the clamp members. The semi-circular clamp members may be moved about the hinge pin toward the axis of the turret to effect the clamping action, by means of a right and left threaded screw 243 threaded through suitable nuts carried by lugs 244 and 245 at the free ends of the clamp sections. Rotary motion is given to the screw 243, to effect clamping of the turret to the head after the indexing has been completed, by the action of the cam 24 rotatable with the shaft 20. This cam is tracked by a roller 246, carried by a slide-block 247, translatably mounted in a bracket 248 secured to the head H and projecting to the inside thereof through an orifice 249. A rod 251 is connected at one end to the lower end of the slide block 247 and is pivotally attached at its other end to an arm 252 fixed to the screw 243. From the foregoing it will be perceived that rotation of the shaft 20 and the cam 24 will through the mechanism described effect rotation of the screw 243 alternately in opposite directions thereby effecting turret-clamping and turret-releasing movements in the clamp members 238ᵃ and 238ᵇ. The clamping cam 24 is so timed with respect to the indexing mechanism that the clamp is released just prior to the index of the turret and tightened again after the index is completed and the turret locked by the bolt 229.

Work-blank feed.

Automatic means is provided for placing the work in the work-chucks as they successively reach station #1, the chucks each having been opened as it passed through station #5 and the finished work permitted to fall therefrom by gravity.

This automatic loading of the chucks may be effected by two independent yet coordinated mechanisms, one serving to feed the work blanks into vertical alignment with the chucks and the other to elevate the blanks and insert them into the chucks. The work-feed is built as a unit, and may be removed from the machine without dis-assembling it. A supporting bracket 254 is fixed upon the head 169 of the main tool slide, and has pivoted to it, at 255, an oscillatory feeder-arm 256 which has connected to it, at its free end, a feed-slide 257. The feed slide is adapted to have a horizontal movement in a predetermined path on the bracket 254 and this may be effected by having rollers 258 on the slide track a suitable groove 259 in the upper face of the bracket. The forward end 257ᵃ of the feed-slide is shaped to hold a work-blank, which it may receive either from a suitable magazine (not shown) or which may be placed therein manually. The path of movement of the feed-slide and the work-blank carried thereby intersects the axis of the work chuck when in position #1 and in the extreme position of the slide places the work-blank between the chuck and a suitable blank elevating device later to be described.

The arm 256 receives its oscillatory movements from a crank arm 260 fixed upon a short shaft 261 journaled in the bracket 254. This shaft is rotated from the shaft 20 by a train of gears 262, 263, 264, and 265 all located within a supplemental gear case $q$ carried by the feed supporting bracket. Of these gears, the former is splined to the shaft 20 so that it may move vertically thereon during the translating movements of the main tool-slide, and the latter is fixed to the shaft 261 which also carries the crank arm 260. A block 266 carried by the crank arm tracks a slot 267 in the feed arm 256 whereby rotation of the crank arm will effect oscillation of the feeder arm and the feed slide carried thereby. The shaft 261 is so located with respect to the pivot 255 of the feeder-arm that during the forward movement of the feed-slide, i. e. when it is carrying the work-blank, the block 266 is operating in the outer end of the slot 267 whereby the movement of the arm and slide is relatively slow. On its return stroke the block is operating substantially nearer the pivot 255 and therefore the arm is moved at a materially faster rate.

The feeder arm 256 has a positive movement of predetermined amplitude under the action of the crank arm 260 and to permit of a slight relative movement between the arm and the feed-slide, thereby to prevent breakage of the parts in the event that the latter or the work-blank should accidentally come into contact with any stationary object, the arm and slide are preferably connected together impositively as by means of a long bolt 268 loosely passed through apertures in projecting portions of each. A spring 269 interposed between a portion of the feed-slide and a nut on the bolt normally holds the arm and slide together but permits

Work-blank elevating means.

Cooperating with the work-feed is a work-elevating means which receives the blank from the feeding mechanism elevates it and places it within the then-open chuck located thereabove at station #1. This work-elevating mechanism is preferably actuated by fluid pressure means and may be constructed as a unit and controlled as shown more particularly in Figs. 16, 22 and 23. As shown in Fig. 16 the work-blank is placed, by the feed-slide, upon the upper surface of a freely rotatable table 270 mounted for universal movement upon a ball 271 fitted within the head 272 of a reciprocating rod 273 translatably mounted in a sub-frame 274 supported upon the main tool slide M and projecting thereinto. Universal movement of the table 270 is, however, limited by having the downturned annular flange 270$^a$ thereof terminate adjacent a horizontally disposed abutment surface 274$^a$ provided by the subframe 274. Any one of a number of work locating plates 275, each having a work-receiving seat 275$^a$, to fit a specific size and form of work-blank, may be removably secured upon the top of the table 270 to receive the work-blank from the feed slide and locate it in vertical alignment with the chuck thereabove. The table 270, and the work-blank thereon are preferably elevated and depressed by fluid pressure means, and to that end the subframe 274 is formed with two aligned cylinders 276 and 277 of unequal diameter. A piston rod 278, having at its upper end a laterally projecting arm 279, which surrounds the rod 273 and supports the head 272, extends through the cylinder 276 and into the cylinder 277 and carries within said cylinders pistons 280 and 281 respectively. Pressure is maintained constantly in the cylinder 277 by means of fluid entering the cylinder through a pipe 282. This pressure tends to move the piston 281, and thereby the rod 278 and the table downwardly. At predetermined times fluid pressure is admitted into the cylinder 276 beneath the piston 280 through a pipe 283. Inasmuch as the area of the piston 280 is materially greater than the area of the piston 281 pressure in the cylinder 276 will overcome the pressure in the cylinder 277 thereby causing the piston rod, arm 279, head 272 and the table 270 with the work thereon to be elevated thereby placing the work-blank in the chuck thereabove. After the chuck has been closed to grip the work, pressure through the pipe is discontinued and the pressure in the cylinder 277 depresses the piston-rod and the parts movable therewith to lower the table into position to receive the next blank from the automatic feed.

Inasmuch as the work-table 270 is freely rotatable and the work merely rests thereon, the work-blank may be picked up by the chucks while they are rotating without undue shock and strain on the parts.

Means for admitting fluid pressure into the cylinder 276 in timed relation with movements of the indexing and feed mechanism is illustrated in Fig. 22. Fluid pressure is supplied from any suitable source and is controlled by a so-called "Hanifan" valve $v'$ (Fig. 26) which is similar in construction and operation to the valve $v^2$ shown in Fig. 23, which, however, is adapted to control the closing of the chucks as will later be described to which reference may be had. This type of valve is adapted to be actuated by the oscillation or rotation of a valve stem and serves first to admit fluid from a supply pipe into a delivery pipe and then to exhaust the fluid therefrom. The stem of the valve which controls the fluid pressure into the cylinder 276 through the pipe 280 is shown at 284 in Fig. 22. This stem has secured to it an arm 285 arranged in the path of a stud 286 on the periphery of the disk 78 hereinbefore referred to. Thus at the proper time the stud will engage the arm 285 and move it and the valve-stem clockwise thereby opening the valve and admitting fluid into the cylinder 276 through the pipe 283. After the work-blank has been grasped by the chuck the stud 286 contacts with a lever 287 fulcrumed at 288 on the valve casing. This lever is connected to a rack-bar 289 which drives a pinion 290 meshing with a gear 291 fixed to the valve stem 284, thus swinging of the lever clockwise by the stud 286 will, through the mechanism described oscillate the valve stem counter-clockwise thereby discontinuing the flow of fluid from the supply to the pipe 283 and connecting that pipe with an exhaust port. Fluid pressure in the cylinder 277 then depresses the piston rod 287 and the ports connected therewith.

Work-chuck closing and opening means.

The work-chucks $k$ (see Fig. 6) are of the split-collet type and each comprise a head $k'$ formed with radially yielding work-gripping jaws $k^2$, the outer walls of which are inclined and fitted within the inclined walls of a symmetrical body member $k^3$ secured upon the lower end of the spindle. The jaws $k^2$ are formed with an internal work-receiving chamber $k^4$ shaped to fit the work to be machined. For convenience of manufacture the head $k'$ and the body member $k^3$ may be in the form of truncated cones. The head $k$ is formed with a sleeve-like portion $k^5$ threaded upon a draw-bar 292 translatably mounted within a bore 293 in the spindle. It will readily be perceived that axial movement of the draw-bar upwardly will draw the head $k^1$ upwardly within the inclined body member $k^3$ causing the jaws to be moved radially inward thereby gripping the work-blank which has been inserted within the chamber $k^4$ by the work-blank elevating means. Likewise axial movement of the bar 292 downwardly will effect opening of the chuck-jaws. Closing of the chucks may be effected by means now to be described.

Adjacent its upper end the draw-bar is provided with an enlarged head 294 formed with an annular groove 295 into which projects one of the arms $296^a$ of each of a plurality of bell-crank levers 296 fulcrumed on pins 297 fixed in a collar 298 secured upon the spindle. A substantially conical member 299 is translatably mounted on the upper end of each of the spindles and is formed with a plurality of inclined shoulders 300 connecting a plurality of circumferential flats 301. The bell crank levers 296 also have upstanding arms $296^b$ adapted to bear upon the periphery of the member 299 and downward movement of the member will cause the inclined shoulders successively to force outwardly on the upstanding arms whereby the levers are tipped backwardly about their fulcrums and their arms $296^a$ are moved upwardly carrying with them the draw-bar 292. When the chuck has firmly grasped the work-blank further movement of the member 299, and the draw bar, is precluded and the radial flat then in engagement with the arms $296^b$ will prevent return movement of the bell-crank levers, which in turn will prevent downward movement of the draw-bar thereby maintaining the chuck closed on the work blank.

Due to variations in the sizes of the various work-blanks, etc. the chucks will be required to close more at one time than at another tightly to grip the work. Therefore, it is desirable that the movement of the member 299 and the draw-bar be variable. To that end it is proposed to actuate these members impositively. This conveniently may be effected by the use of fluid pressure as will now be described, reference being had particularly to Figs. 6, 8 and 22. Adjacent each of the spindles is fulcrumed (on a pin 303 extending between ears 302 provided by the head H) a plural armed lever 304 of which one arm, $304^a$, is formed as a yoke which carries blocks 305 pivotally mounted upon semi-circular shoes $299^s$ fitted within the annular groove $299^g$ in the conical member 299. Another arm $304^b$ of the lever projects upwardly and is arranged in the path of the free end of a piston rod 306 which passes through a cylinder 307 of comparatively large diameter and extends into a relatively smaller cylinder 308. Pistons $307^a$ and $308^a$ are fixed to the rod 306 in the cylinders 307 and 308 respectively. A fluid pressure pipe 309 enters the cylinder 308 at the end of the piston toward the spindle and constantly maintains a pressure therein which tends to retract the rod 306. At a predetermined time, i. e. immediately after the work-blank has been inserted in the work-chuck, fluid pressure is admitted into the cylinder 307 through a pipe 310. Inasmuch as the area of the piston $307^a$ is several times the area of the piston $308^a$ the pressure in the cylinder 307 will overcome the pressure in the cylinder 308 with the result that the rod 306 will be quickly and forcibly moved into contact with the arm $304^b$ of the lever 304, thereby swinging the lever about its fulcrum, depressing the arm $304^a$ and conical member 299 and closing the chuck jaws on the work-blank. As previously stated the flats on the member 299 serve to lock the chucks closed and therefore as soon as the chucks are closed the rod 306 may be withdrawn from the arm $304^b$. This is effected by discontinuing the flow of fluid into the cylinder 307 through the pipe 310 and permitting the pressure therein to be exhausted, whereupon the pressure in the cylinder 308 will retract the rod. This admission of pressure into the cylinder 307 and the exhaust thereof is timed to take place after the blank elevating table has been raised and before it is again depressed. The means for effecting this is shown in Figs. 22 and 23. A fluid pressure supply pipe 311 is adapted to be connected with the pipe 310 by a "Hanifan" valve $v^2$, comprising an oscillatory disk 312 which, by its oscillation, is adapted first to establish communication between the supply pipe and the pipe 310, and then to break that communication and connect the pipe 310 with an exhaust port 313. Oscillatory movements may be transmitted to the disk 312 by having it connected with a rod 314 rotatably journaled in the valve casing and having secured to its forward end an arm 315 arranged in the path of the stud 286 on the periphery of the disk 78. Thus it will be seen that after the stud has contacted with and rocked the arm 285, which effected elevation of the work blank, the stud will likewise rock the arm 315 which will open the valve $v^2$ and effect the closing of the chuck. A contractile spring 316, connected at one end to the arm 315 and at its other end to a pin in the valve casing, serves to return the arm to its initial position and thereby to close the valve $v^2$ immediately the stud 286 is moved out of contact with the arm.

Opening of the chucks to permit the work to fall therefrom as the chuck is indexed into position #5 is effected by a very simple and effective mechanism. The three armed lever 304 also has an arm 304ᶜ not hereinbefore referred to, which, when the spindle is in the intermediate positions #1 and #4 underlies one end, 217ᵃ, of a lever 317 fulcrumed upon a screw 318 threaded into a boss 319 within the head H. The other end 317ᵇ of the lever 317 carries a roller 320 which tracks the upper inclined face of the cam 22 whereby rotation of the cam 22 with the shaft 20 causes the end 317ᵇ of the lever to be elevated thereby depressing the other end and causing it in turn to depress the arm 304ᶜ of the lever 304. This causes the arm 304ᵃ and the chuck actuating member 299 to be elevated whereupon the ends 296ᵇ of the levers 296 are free to move inwardly thereby permitting the draw bar to move downwardly and the chucks to open by their own resiliency.

*Spindle rotation arresting means.*

As hereinbefore stated the work-blank may be inserted within the chuck while the latter is rotating. There may be, however, certain times and conditions which would make it desirable to have the chucks stationary during the insertion of the new work-blank. This invention provides means whereby this readily may be effected. Referring now to the modification shown in Figs. 27 and 28, in which the parts which correspond to the parts illustrated in the other figures have been similary designated, it will be seen that the gear 7 is constantly driven from the pinion 6 on the shaft 5. In the form of the invention illustrated in Fig. 6 this gear is shown as keyed to the spindle S and therefore the spindle will be driven constantly. In the modification above referred to, the gear 7 is rotatably journaled on the spindle S and therefore may rotate while the spindle is at rest. This gear, however, may be clutched to the spindle by the engagement of clutch teeth 321, and 322, preferably of the saw-tooth type, formed respectively on the gear 7 and on a clutch collar 323 translatably mounted on the spindle S and held against relative movement with respect to the draw-bar 292 by a pin 324 fixed in the draw bar and extending through apertures 325 in the spindle. Thus it will be perceived that as the draw-bar is moved downwardly to open the chuck the clutch collar likewise will be moved downwardly and the clutch teeth 321 and 322 will be separated, thereby breaking the drive from the gear 7 to the spindle which latter, with the chuck carried thereby, will come to rest. Conversely when the draw-bar is moved upwardly to close the chuck the clutch teeth will be engaged and the spindle will be caused to rotate synchronously with the gear 7.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A machine combining a circular series of equi-spaced work-carriers; a similarly spaced circular series composed of a single work-inserter and a plurality of work-formers, the number of the latter being but one less than the number of the work-carriers; means for intermittently rotating one of said series relatively to the other to bring the elements alternately out of and into opposition; and means for discharging a blank from a work-carrier when said carrier is in a position intermediate the last work-former and the work-inserter.

2. A machine combining a rotatable head; a number of work-carriers equi-spaced angularly thereon; an indexing mechanism for successively turning said head one half of the angular distance between said work-carriers and effecting alternately relatively long and short pauses between successive indexing movements; and means for inserting and removing work from said carriers operative at alternate intervals of said indexing mechanism..

3. A machine combining a rotatable head; a number of carriers adapted to hold work at their lower ends and equi-spaced angularly on said head; an indexing mechanism for successively turning said head one half of the angular distance between said work-carriers; means for elevating and inserting work into said carriers; and mechanism for releasing and permitting work to drop from said carriers, said means and mechanism being operative at alternate intervals of said indexing mechanism.

4. A machine combining an arcuate series of equi-spaced work-carriers; a similarly spaced arcuate series composed of a work-inserter and work-formers, the number of the latter being one less than the number of the work-carriers; a laterally shiftable work-former; means for intermittently rotating one of said series relatively to the other to bring the carriers and formers alternately out of and into opposition; means for causing said formers and work simultaneously to move into engagement while they are in opposition; and means for discharging the formed work from its work-carrier when out of opposition to its last acting work-former.

5. A machine combining a rotatable head; a number of work-carriers equi-spaced angularly thereon; an indexing mechanism for successively turning said head one half of the angular distance between said work-carriers; means for inserting and removing work from said carriers, operative at alternate intervals of said indexing mechanism; and means for causing said indexing mechanism to function after alternately shorter and longer periods of rest.

6. A machine combining a rotatable head; a number of work-carriers equi-spaced angularly thereon; an indexing mechanism for successively turning said head one half of the angular distance between said work-carriers; means operative at alternate intervals of said indexing mechanism for causing a carrier to release its work and subsequently to grasp a new piece of work, and means for causing said indexing mechanism to function after alternately shorter and longer periods of rest.

7. A machine combining an arcuate series of equi-spaced work-carriers; a shorter arcuate series of similarly spaced work-formers, the number of the latter being one less than the number of the work-carriers; a laterally shiftable work-former; means for intermittently rotating one of said series relatively to the other to bring the carriers and formers alternately out of and into opposition; means for causing said formers and work simultaneously to move into engagement while they are in opposition; and means for discharging the formed work from its work-carrier when out of opposition to its last acting work-former.

8. A machine combining a rotatable head; a number of carriers adapted to hold work at their lower ends and equi-spaced angularly on said head; work-inserting means located beneath one of said carriers when said carrier is in one of its positions of rest; an indexing mechanism for successively turning said head one half of the angular distance between said work-carriers; and mechanism located in advance of said inserting means an angular distance equal to one half the angular distance between said work-carriers for releasing and permitting work to drop from said carriers, said releasing and inserting mechanisms being operative at alternate intervals of said indexing mechanism.

9. A machine combining an upper arcuate series of equi-spaced work-carriers; an underlying shorter arcuate series of similarly spaced work-formers, the number of the latter being one less than the number of the work-carriers; means for intermittently rotating one of said series relatively to the other to bring the elements alternately out of and into opposition; and means for dropping a blank from a work-carrier when out of opposition to a work-former.

10. A machine combining a circular series of equi-spaced depending work-carriers; a number of concentrically arranged work-formers beneath said work-carriers; means for effecting an intermittent relative rotation to bring the carriers and formers alternately out of and into opposition; means for discharging work from its carrier when out of opposition to the last acting work-former; and means active after the next succeeding movement of the rotatable element to elevate a work-piece and insert it into one of said work-carriers.

11. A machine combining an upper non-translatable roulette; continuously-rotating spindles journaled therein and terminating in their lower ends in work-carriers; an underlying elevatable head; means carried by said head to insert work-pieces into said work-carriers; upwardly-projecting work-formers mounted on said head; index means for turning said overlying roulette step by step; and head-elevating mechanism for raising said work-formers into forming relation with the work in said carriers.

12. A machine combining a side-frame; an upper non-translatable roulette; continuously-rotating spindles journaled therein and terminating in their lower ends in work-carriers; an underlying elevatable head; upwardly-projecting work-formers mounted on said head; a side work-formers on said side-frame projecting laterally in the plane of said work-carriers; index means for turning said overlying roulette step by step; head-elevating mechanism for raising said work-formers into forming relation with the work in said carriers; and means for also advancing laterally said side work-former.

13. A machine combining an upper non-translatable roulette; continuously-rotating spindles journaled therein and terminating in their lower ends in work-carriers; a side-frame; a laterally-projecting work-former mounted on said side-frame; index means for turning said overlying roulette step by step; and mechanism for laterally shifting said work-former into forming relation with the work in one of said carriers.

14. A machine combining an upper non-translatable roulette; continuously-rotating spindles journaled therein and terminating in their lower ends in work-carriers; side-frames; a number of laterally-projecting work-formers mounted on said side-frames; index means for turning said overlying roulette step by step; and mechanism for laterally shifting said work-formers simultaneously into forming relation with the work in said carriers.

15. A machine combining upper and lower opposing heads; a pair of side-frames in the nature of vertical uprights, the side faces of said side-frames being substantially convergent to the common axis of said heads; and work-formers mounted on certain of side faces and adapted to be shifted horizontally.

16. A machine combining a base; a pair of side-frames upstanding therefrom, the side-frames being substantially triangular in horizontal section; a roulette supported between the upper ends of said side-frames; a plurality of work-carrying spindles depending from said roulette; a table elevatable between the lower ends of said side-frames; a number of upright work-formers mounted on said table; a number of horizontal work-formers mounted on the intermediate portions of said side-frames; and a transmission system for rotating said spindles, for indexing said roulette, for elevating said table, and for laterally shifting said horizontal work-formers.

17. An upright chucking machine combining a U-shaped frame, the upright legs thereof being hollow and providing radial side-walls; radially sliding tool-holders gibbed to said side-walls; a vertically movable head in the crotch of said U-shaped frame and gibbed to opposite legs thereof; and a transmission having branches extending upwardly within said hollow legs and terminating in reduction gearing for translating said tool-holders.

18. An upright chucking machine combining a U-shaped frame, the upright legs thereof being hollow and providing radial side-walls; radially sliding tool-holders gibbed to said side-walls; a vertically movable head in the crotch of said U-shaped frame and gibbed to opposite legs thereof; and a transmission having branches extending upwardly within said hollow legs and terminating in reduction gearing for translating said tool-holders, said transmission also having an intermediate branch including reduction gearing for elevating said head.

19. An upright chucking machine combining a U-shaped frame, the upright legs thereof being hollow and providing radial side-walls; a multiple-spindle work-carrying turret rotatably supported by the upper ends of said legs; radially sliding tool-holders gibbed to said side-walls; a vertically movable head in the crotch of said U-shaped frame and gibbed to opposite legs thereof; and a transmission having branches extending upwardly within said hollow legs and terminating in reduction gearing for translating said tool-holders.

20. An upright chucking machine combining a U-shaped frame, the upright legs thereof being hollow and providing radial side-walls; a multiple-spindle work-carrying turret rotatably supported by the upper ends of said legs; radially sliding tool-holders gibbed to said side-walls; a vertically movable head in the crotch of said U-shaped frame and gibbed to opposite legs thereof; and a transmission having branches extending upwardly within said hollow legs and terminating in reduction gearing for translating said tool-holders, said transmission also having an intermediate branch including reduction gearing for elevating said head.

21. An upright chucking machine combining a U-shaped frame, the upright legs thereof being hollow and providing radial side-walls; radially sliding tool-holders gibbed to said side-walls; a compound rest; a tool-holder shiftable thereby both horizontally and vertically; a vertically movable head in the crotch of said U-shaped frame and gibbed to opposite legs thereof; and a transmission having branches extending upwardly within said hollow legs and terminating in reduction gearing for translating said tool-holders.

22. An upright chucking machine combining a U-shaped frame, the upright legs thereof being hollow and providing radial side-walls; radially sliding tool-holders gibbed to said side-walls; a compound rest; a tool-holder shiftable thereby both horizontally and vertically; a vertically movable head in the crotch of said U-shaped frame and gibbed to opposite legs thereof; and a transmission having branches extending upwardly within said hollow legs and terminating in reduction gearing for translating said tool-holders, said transmission also having an intermediate branch including reduction gearing for elevating said head.

23. An upright chucking machine combining a U-shaped frame, the upright legs thereof being hollow and providing radial side-walls; a multiple-spindle work-carrying turret rotatably supported by the upper ends of said legs; radially sliding tool-holders gibbed to said side-walls; a compound rest; a tool-holder shiftable thereby both horizontally and vertically; a vertically movable head in the crotch of said U-shaped frame and gibbed to opposite legs thereof; and a transmission having branches extending upwardly within said hollow legs and terminating in reduction gearing for translating said tool-holders.

24. An upright chucking machine combining a U-shaped frame, the upright legs thereof being hollow and providing radial side-walls; a multiple-spindle work-carrying turret rotatably supported by the upper ends of said legs; radially sliding tool-holders gibbed to said side-walls; a compound rest;

a tool-holder shiftable thereby both horizontally and vertically; a vertically movable head in the crotch of said U-shaped frame and gibbed to opposite legs thereof; and a transmission having branches extending upwardly within said hollow legs and terminating in reduction gearing for translating said tool-holders, said transmission also having an intermediate branch including reduction gearing for elevating said head.

In witness whereof, I hereunto subscribed my name.

ADOLPH L. DE LEEUW.